(12) United States Patent
Fijolek et al.

(10) Patent No.: US 7,068,597 B1
(45) Date of Patent: Jun. 27, 2006

(54) SYSTEM AND METHOD FOR AUTOMATIC LOAD BALANCING IN A DATA-OVER-CABLE NETWORK

(75) Inventors: John G. Fijolek, Naperville, IL (US); Irene Gilbert, Palatinem, IL (US); Ali Akgun, Evanston, IL (US); Shahidur Khan, Schaumburg, IL (US); Vikram Swamy, Chicago, IL (US)

(73) Assignee: 3Com Corporation, Marlborough, MA (US)

( * ) Notice: Subject to any disclaimer, the term of this patent is extended or adjusted under 35 U.S.C. 154(b) by 1315 days.

(21) Appl. No.: 09/722,980

(22) Filed: Nov. 27, 2000

(51) Int. Cl.
*H04L 1/00* (2006.01)

(52) U.S. Cl. .............. 370/230; 370/485; 370/401; 370/235; 455/453

(58) Field of Classification Search ......... 370/230–235, 370/401, 485, 395.5, 395.52, 395.54; 455/453; 709/203, 227
See application file for complete search history.

(56) References Cited

U.S. PATENT DOCUMENTS

| | | | |
|---|---|---|---|
| 4,644,533 A | 2/1987 | Braff et al. | 370/94 |
| 4,881,263 A | 11/1989 | Herbison et al. | 380/21 |
| 4,996,685 A | 2/1991 | Farese et al. | 370/58.1 |
| 5,014,234 A | 5/1991 | Edwards, Jr. | 364/900 |
| 5,138,712 A | 8/1992 | Corbin | 395/700 |
| 5,301,273 A | 4/1994 | Konishi | 395/200 |

(Continued)

FOREIGN PATENT DOCUMENTS

WO   WO 00/67385   11/2000

OTHER PUBLICATIONS

Volz et al, DHC load balancing algorithm, Internet Draft, pp. 1–8, Mar. 2000.*

Rabil et al, DHCP Failover Protocol, Internet Draft, pp. 1–9, Nov. 1997.*

Tominaga et al, Problems and Solutions of DHCP, pp. 1–10, 1995.*

"Radio Frequency Interface Specification (Interim Specification) SP–RF1–104–980724", MCNS Holdings, L.P., 1997, pp. ii to 196.

Droms, R., *Dynamic Host Configuration Protocol*, Request for Comments 1541, Oct. 1993, pp. 1 to 31.

(Continued)

*Primary Examiner*—Frank Duong
(74) *Attorney, Agent, or Firm*—McDonnell Boehnen Hulbert & Berghoff LLP

(57) ABSTRACT

A method and system for load balancing in a network system such as a data-over-cable system. One method includes receiving a first message on a first network device such as a cable modem termination system ("CMTS") from a second network device and marking the first message with an identifier of a network access device. The method further includes intercepting the first message on a third network device such as a provisioning/access manager prior to any first protocol server such a Dynamic Host Configuration Protocol server receives the first message. When the third network device intercepts the first message, the third network device determines capabilities of the second network device and applies a set of rules to load balance any requests between a plurality of channel pairs. Each charmel pair is associated with at least one capability of a network device and also has a load factor parameter and a threshold value defining a capacity of a channel pair. The third network device assigns the second network device to a predetermined channel pair based on the capabilities of the second network device, a load factor of the channel pair and a capacity of the channel pair.

33 Claims, 23 Drawing Sheets

U.S. PATENT DOCUMENTS

| | | | |
|---|---|---|---|
| 5,347,304 A | 9/1994 | Moura et al. ................. 348/12 |
| 5,430,727 A | 7/1995 | Callon ..................... 370/85.13 |
| 5,442,749 A | 8/1995 | Northcutt et al. ...... 395/200.09 |
| 5,488,412 A | 1/1996 | Majeti et al. ................. 348/10 |
| 5,489,897 A | 2/1996 | Inoue ................... 340/870.39 |
| 5,528,595 A | 6/1996 | Walsh et al. ............. 370/85.13 |
| 5,583,931 A | 12/1996 | Schneider et al. .......... 379/399 |
| 5,586,121 A | 12/1996 | Moura et al. ............... 370/404 |
| 5,598,410 A | 1/1997 | Stone ......................... 370/469 |
| 5,600,717 A | 2/1997 | Schneider et al. .......... 379/399 |
| 5,606,606 A | 2/1997 | Schneider et al. .......... 379/399 |
| 5,608,446 A | 3/1997 | Carr et al. ..................... 348/6 |
| 5,610,910 A | 3/1997 | Focsaneanu et al. ........ 370/351 |
| 5,623,542 A | 4/1997 | Schneider et al. .......... 379/399 |
| 5,623,601 A | 4/1997 | Vu ........................ 395/187.01 |
| 5,636,211 A | 6/1997 | Newlin ...................... 370/465 |
| 5,675,732 A | 10/1997 | Majeti et al. ........... 395/200.01 |
| 5,675,742 A | 10/1997 | Jain et al. ................... 395/200 |
| 5,678,041 A | 10/1997 | Baker et al. ................. 395/609 |
| 5,708,654 A | 1/1998 | Arndt et al. ................. 370/242 |
| 5,710,885 A | 1/1998 | Bondi ................... 395/200.54 |
| 5,724,510 A | 3/1998 | Arndt et al. ............. 395/200.5 |
| 5,761,602 A | 6/1998 | Wagner et al. ............. 455/3.1 |
| 5,778,181 A | 7/1998 | Hidary et al. ......... 395/200.48 |
| 5,784,597 A | 7/1998 | Chiu et al. .................. 395/552 |
| 5,790,198 A | 8/1998 | Roop et al. ................. 348/460 |
| 5,790,548 A | 8/1998 | Sistanizadeh et al. ....... 370/401 |
| 5,790,677 A | 8/1998 | Fox et al. ..................... 380/24 |
| 5,790,770 A | 8/1998 | McClure et al. ....... 395/200.61 |
| 5,790,806 A | 8/1998 | Koperda ................ 395/200.82 |
| 5,793,747 A | 8/1998 | Kline ......................... 370/230 |
| 5,799,086 A | 8/1998 | Sudia ........................... 380/23 |
| 5,805,804 A | 9/1998 | Laursen et al. ......... 395/200.02 |
| 5,809,252 A | 9/1998 | Beighe et al. ......... 395/200.57 |
| 5,812,819 A | 9/1998 | Rodwin et al. ............. 395/500 |
| 5,815,664 A | 9/1998 | Asano ................... 395/200.57 |
| 5,818,845 A | 10/1998 | Moura et al. ................. 370/449 |
| 5,819,028 A | 10/1998 | Manghirmalani et al. ....................... 395/185.1 |
| 5,819,042 A | 10/1998 | Hansen .................. 395/200.52 |
| 5,828,655 A | 10/1998 | Moura et al. ................ 370/236 |
| 5,828,666 A | 10/1998 | Focsaneanu et al. ........ 370/389 |
| 5,835,720 A | 11/1998 | Nelson et al. ......... 395/200.54 |
| 5,835,727 A * | 11/1998 | Wong et al. ................. 709/238 |
| 5,841,777 A | 11/1998 | Cohen ........................ 370/433 |
| 5,848,233 A | 12/1998 | Radia et al. ............ 395/187.01 |
| 5,852,721 A | 12/1998 | Dillon et al. .......... 395/200.47 |
| 5,854,901 A | 12/1998 | Cole et al. .................. 709/245 |
| 5,859,852 A | 1/1999 | Moura et al. ................ 370/449 |
| 5,864,679 A | 1/1999 | Kanai et al. ................. 709/238 |
| 5,870,134 A | 2/1999 | Laubach et al. .............. 348/12 |
| 5,872,523 A | 2/1999 | Dellaverson et al. .. 340/825.52 |
| 5,884,024 A | 3/1999 | Lim et al. .............. 395/187.01 |
| 5,892,754 A | 4/1999 | Kompella et al. ........... 370/236 |
| 5,894,479 A | 4/1999 | Mohammed ................ 370/401 |
| 5,903,558 A | 5/1999 | Jones et al. ................. 370/351 |
| 5,909,549 A | 6/1999 | Compliment et al. ........ 709/223 |
| 5,913,037 A | 6/1999 | Spofford et al. ........ 395/200.56 |
| 5,915,119 A | 6/1999 | Cone ..................... 395/750.02 |
| 5,922,049 A | 7/1999 | Radia et al. ................. 709/220 |
| 5,922,051 A | 7/1999 | Sidey .......................... 709/223 |
| 5,923,659 A | 7/1999 | Curry et al. ................. 370/401 |
| 5,926,458 A | 7/1999 | Yin ............................. 370/230 |
| 5,929,850 A | 7/1999 | Broadwin et al. ........... 345/327 |
| 5,941,988 A | 8/1999 | Bhagwat et al. ............. 713/201 |
| 5,943,604 A | 8/1999 | Chen et al. ................... 455/5.1 |
| 5,954,797 A | 9/1999 | Sidey .......................... 709/223 |
| 5,958,007 A | 9/1999 | Lee et al. .................... 709/219 |
| 5,960,177 A | 9/1999 | Tanno .................... 395/200.59 |
| 5,974,453 A | 10/1999 | Andersen et al. ........... 709/220 |
| 5,982,748 A | 11/1999 | Yin et al. .................... 370/232 |
| 5,987,524 A | 11/1999 | Yoshida et al. .............. 709/245 |
| 5,991,292 A | 11/1999 | Focsaneanu et al. ........ 370/352 |
| 5,991,306 A | 11/1999 | Burns et al. ................. 370/429 |
| 5,996,076 A | 11/1999 | Rowney et al. ............. 713/201 |
| 5,999,536 A | 12/1999 | Kawafuji et al. ............ 370/401 |
| 6,003,077 A | 12/1999 | Bawden et al. .............. 709/223 |
| 6,005,851 A | 12/1999 | Craddock et al. ........... 370/329 |
| 6,006,264 A | 12/1999 | Colby et al. ................. 709/226 |
| 6,009,103 A | 12/1999 | Woundy ..................... 370/401 |
| 6,012,088 A | 1/2000 | Li et al. ...................... 709/219 |
| 6,013,107 A | 1/2000 | Blackshear et al. ......... 703/229 |
| 6,014,545 A | 1/2000 | Wu et al. .................... 455/3.1 |
| 6,018,767 A | 1/2000 | Fijolek et al. ............... 709/218 |
| 6,031,841 A | 2/2000 | Woundy ..................... 370/410 |
| 6,032,019 A | 2/2000 | Chen et al. ................... 455/5.1 |
| 6,041,041 A | 3/2000 | Ramanathan et al. ....... 370/241 |
| 6,046,979 A | 4/2000 | Bauman ...................... 370/229 |
| 6,049,546 A | 4/2000 | Ramakrishnan ............. 370/412 |
| 6,049,825 A | 4/2000 | Yamamoto .................. 709/221 |
| 6,049,826 A | 4/2000 | Beser .......................... 709/222 |
| 6,052,724 A | 4/2000 | Willie et al. ................ 709/223 |
| 6,058,421 A | 5/2000 | Fijolek et al. ............... 709/225 |
| 6,061,349 A | 5/2000 | Coile et al. ................. 370/389 |
| 6,064,372 A | 5/2000 | Kahkoska ................... 345/173 |
| 6,065,049 A | 5/2000 | Beser .......................... 709/218 |
| 6,070,187 A | 5/2000 | Subramaniam et al. ..... 709/220 |
| 6,070,242 A | 5/2000 | Wong et al. ................. 713/201 |
| 6,070,246 A | 5/2000 | Beser .......................... 713/201 |
| 6,073,178 A | 6/2000 | Wong et al. ................. 709/229 |
| 6,075,787 A | 6/2000 | Bobeck et al. .............. 370/395 |
| 6,091,709 A | 7/2000 | Harrison et al. ............. 370/235 |
| 6,094,431 A | 7/2000 | Yamato et al. .............. 370/395 |
| 6,104,700 A | 8/2000 | Haddock et al. ............ 370/235 |
| 6,112,258 A | 8/2000 | Miller et al. .................. 710/19 |
| 6,122,254 A | 9/2000 | Aydemir et al. ............. 370/235 |
| 6,128,298 A | 10/2000 | Wootton et al. ............. 370/392 |
| 6,130,879 A | 10/2000 | Liu .............................. 370/230 |
| 6,130,880 A | 10/2000 | Naudus et al. .............. 370/235 |
| 6,137,792 A | 10/2000 | Jonas et al. .................. 370/354 |
| 6,137,793 A | 10/2000 | Gorman et al. .............. 370/360 |
| 6,148,410 A | 11/2000 | Naskey et al. .................. 714/4 |
| 6,157,965 A | 12/2000 | Mohammed et al. ........... 710/8 |
| 6,170,061 B1 | 1/2001 | Beser .......................... 713/201 |
| 6,178,455 B1 | 1/2001 | Schutte et al. ............... 709/228 |
| 6,185,624 B1 | 2/2001 | Fijolek et al. ............... 709/239 |
| 6,189,102 B1 | 2/2001 | Beser .......................... 713/201 |
| 6,208,656 B1 | 3/2001 | Hrastar et al. ............... 370/401 |
| 6,212,563 B1 | 4/2001 | Beser .......................... 709/227 |
| 6,216,171 B1 | 4/2001 | Isono et al. .................. 709/250 |
| 6,223,222 B1 | 4/2001 | Fijolek et al. ............... 709/227 |
| 6,240,464 B1 | 5/2001 | Fijolek et al. ............... 709/250 |
| 6,243,369 B1 | 6/2001 | Grimwood et al. ......... 370/335 |
| 6,260,072 B1 | 7/2001 | Rodriguez-Moral ........ 709/241 |
| 6,269,099 B1 | 7/2001 | Borella et al. ............... 370/389 |
| 6,272,150 B1 | 8/2001 | Hrastar ........................ 370/486 |
| 6,275,853 B1 | 8/2001 | Beser et al. .................. 709/223 |
| 6,289,377 B1 | 9/2001 | Lalwaney et al. ........... 709/222 |
| 6,295,554 B1 | 9/2001 | Karadogan et al. .......... 709/219 |
| 6,301,223 B1 | 10/2001 | Hrastar et al. ............... 370/227 |
| 6,301,618 B1 | 10/2001 | Sitaraman et al. ........... 709/227 |
| 6,308,328 B1 | 10/2001 | Bowcutt et al. ............. 725/111 |
| 6,331,987 B1 | 12/2001 | Beser .......................... 370/486 |
| 6,332,163 B1 | 12/2001 | Bowman-Amuah ......... 709/231 |
| 6,337,858 B1 | 1/2002 | Petty et al. .................. 370/356 |
| 6,351,773 B1 | 2/2002 | Fijolek et al. ............... 709/228 |
| 6,370,147 B1 | 4/2002 | Beser .......................... 370/401 |
| 6,393,478 B1 | 5/2002 | Bahlmann ................... 709/224 |
| 6,442,158 B1 | 8/2002 | Beser .......................... 370/352 |
| 6,449,291 B1 | 9/2002 | Burns et al. ................. 370/516 |
| 6,453,472 B1 | 9/2002 | Leano et al. ................. 725/111 |

| | | | |
|---|---|---|---|
| 6,490,727 B1 | 12/2002 | Nazarathy et al. | 725/129 |
| 6,510,162 B1 | 1/2003 | Fijolek et al. | 370/432 |
| 6,671,259 B1 * | 12/2003 | He et al. | 370/238 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hardt et al. | 725/107 |

OTHER PUBLICATIONS

RFC 791, *Internet Protocol, DARPA Internet Program Protocol Specification*, Sep. 1981, pp. 1–37.

Postel, J., *Internet Protocol, DARPA Internet Program Protocol Specification*, RFC 792, Sep. 1981, pp. 1–14.

Postel, J., *User Datagram Protocol*, RFC 768, Aug. 28, 1980, pp. 1–3.

RFC 793, *Transmission Control Protocol, DARPA Internet Program Protocol Specification*, Sep. 1981, pp. 1–68.

Case, J. et al., *A Simple Network Management Protocol (SNMP)*, RFC 1157, May 1990, pp. 1–26.

Sollins, K., *The TFTP Protocol (Revision 2)*, RFC 1350, Jul. 1992, pp. 1–9.

Alexander, S., *DHCP Options and BOOTP Vendor Extensions*, RFC 2132, Mar. 1997, pp. 1–27.

"Radio Frequency Interface Specification (Interim Specification) SP–RF1.1–I03–991105", MCNS Holdings, L.P., 1999, pp. Ii to 366.

"Cable Modem to Customer Premise Equipment Interface Specification (Interim) SP–CMCI–I02–980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP–OSSI–BPI–I01–980331", MCNS Holdings, L.P., 1997 and 1998, pp. ii to 33.

"Cable Modem Termination System–Network Side Interface Specification (Interim Specification) SP–CMTS–NSII01–960702", MCNS Holdings, L.P., 1996, pp. ii to 13.

"Removable Security Module Interface Specification (Interim Specification) SP–RSMI–I01–980204", MCNS Holdings, L.P., Cable Television Laboratories, Inc., 1997, pp. ii to 47.

"Baseline Privacy Interface Specification (Interim) SP–BPI–I01–970922", MCNS Holdings, L.P., 1997, pp. ii to 65.

"Operations Support System Interface Specification (Interim) SP–OSSII01–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., Cable Television Laboratories, Inc., 1997, pp. ii to 73.

"Security System Specification (Interim Specification) SP–SSI–I01–970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIB, Internet Engineering Task Force, Internet Draft, "<draft–ietf–ipcdn–tri–mib–00.1.txt>," Mar. 1998, pp. 1 to 26.

Kyees, P.J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

"A Solution for the Priority Queue Problem of Deadline–Ordered Serviced Disciplines," N.R. Figueira, IEEE International Conference on Computer Communications and Networks, Sep. 22–25, 1997, pp. 320–325.

"Radio Frequency Interface Specification (Interim Specification) SP–RFI–I05–991105", MCNS Holdings, L.P., 1999, pp. ii to 202.

"Radio Frequency Interface Specification (Interim Specification) SP–RFIv1.1–I06–001215", MCNS Holdings, L.P., 2000, pp. ii to 432.

* cited by examiner

FIGURE 7

MANAGE BOOTFILES

| BOOT FILE ID | TFTP PATH | DESCRIPTION |
|---|---|---|
| 1 | BLACK.CFG | UNKNOWN CM DEFAULT CFG FILE |
| 2 | STANDARD.CFG | STANDARD COS |
| 3 | GOLD.CFG | GOLD COS |

BOOT FILE ID

| 1 |

BOOT FILE PATH

| BLACK.CFG |

DESCRIPTION

| UNKNOWN CM DEFAULT CFG FILE |

[ ADD NEW ]   UPDATE   DELETE

FIGURE 8

MANAGE SERVICE CLASSES

| INCOMING GIADDR | SERVICE CLASS | MAPPED GIADDR | SUBNET MASK | DESCRIPTION |
|---|---|---|---|---|
| 149.112.10.1 | 11 | 149.112.10.1 | 255.255.255.0 | BLACK COS UNKNOWN CM |
| 149.112.10.1 | 12 | 149.112.11.1 | 255.255.255.0 | STANDARD COS |
| 149.112.10.1 | 13 | 149.112.12.1 | 255.255.255.0 | GOLD COS |

| INCOMING GIADDR | SERVICE CLASS | MAPPED GIADDR | SUBNET MASK |
|---|---|---|---|
| 149.112.10.1 | 11 | 149.112.10.1 | 255.255.255.0 |

DESCRIPTION

BLACK COS UNKNOWN CM

[ ADD NEW ]   UPDATE   DELETE

FIGURE 9

MANAGE DHCP FILTERING

| MAC PREFIX | DESCRIPTION |
|---|---|
| 0x00FF11 | GENERIC 1 |
| 0x801122 | COMPANY X |

ENTER ALL PREFIXES THAT ARE TO BE ALLOWED. ALL OTHERS WILL BE DROPPED IF THIS FEATURE IS ENABLED

MAC PREFIX

0xFF11

DESCRIPTION

GENERIC 1

[ADD NEW] [UPDATE] [DELETE]

FIGURE 10

MANAGE DHCP FORWARDING

| PROVIDER ID | IP ADDRESS | DESCRIPTION |
|---|---|---|
| 3 | 20.21.22.23 | PROVIDER "X" |
| 4 | 29.21.22.23 | PROVIDER "Y" |

PROVIDER ID

3

IP ADDRESS

20.21.22.23

DESCRIPTION

PROVIDER "X"

[ADD NEW] [UPDATE] [DELETE]

FIGURE 11

MANAGE CM DEFAULTS AND OPTIONS

THE FOLLOWING VALUES ARE GLOBAL SERVICE OPTIONS. THE DHCP SERVER SHOULD BE RESTARTED/REBOOTED FOR THE CHANGES TO TAKE EFFECT

BOOT FILE ID
`1`

BOOT FILE ID FOR TELCO RETURN
`0`

SERVICE CLASS
`11`

PROVIDER ID
` `

- [ ] ENABLE CM FILTERING
- [x] DISABLE LEASE RENEWALS
- [ ] ENABLE SERVICE CLASSES
- [ ] TRUNCATE RRAS MAC

UNKNOWN CM SETTINGS
- [ ] ASSIGN DEFAULT BOOTFILE
- [ ] DEFAULT DHCP PROCESSING
- [ ] DROP PACKET

DHCP FORWARDING
- [ ] DISABLE FORWARDING
- [ ] FORWARD ALL REQUESTS
- [ ] FORWARD PC REQUESTS ONLY

CM/PC COMBO MAC KEY
` `

[ OK ]   [ CANCEL ]   [ HELP ]

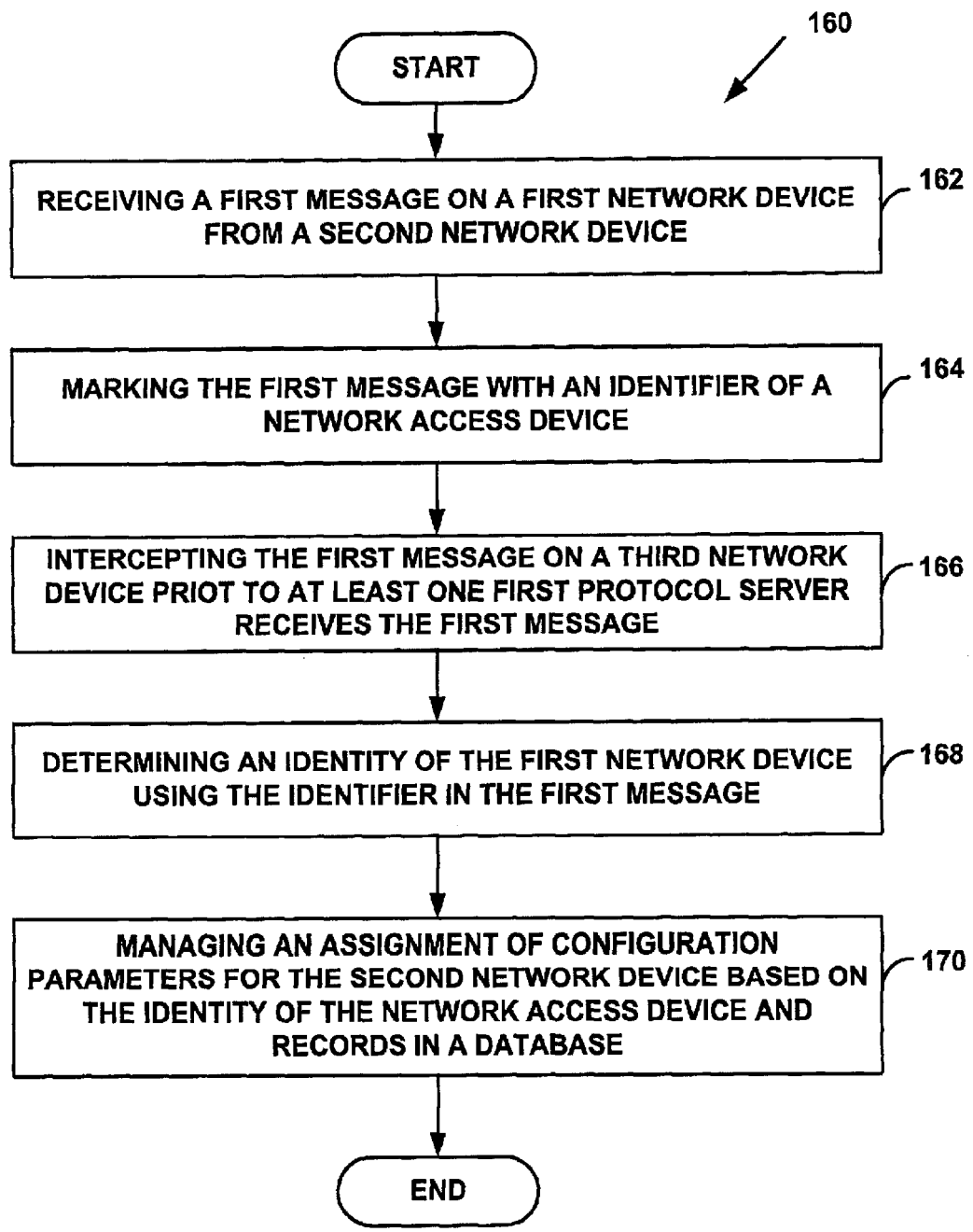

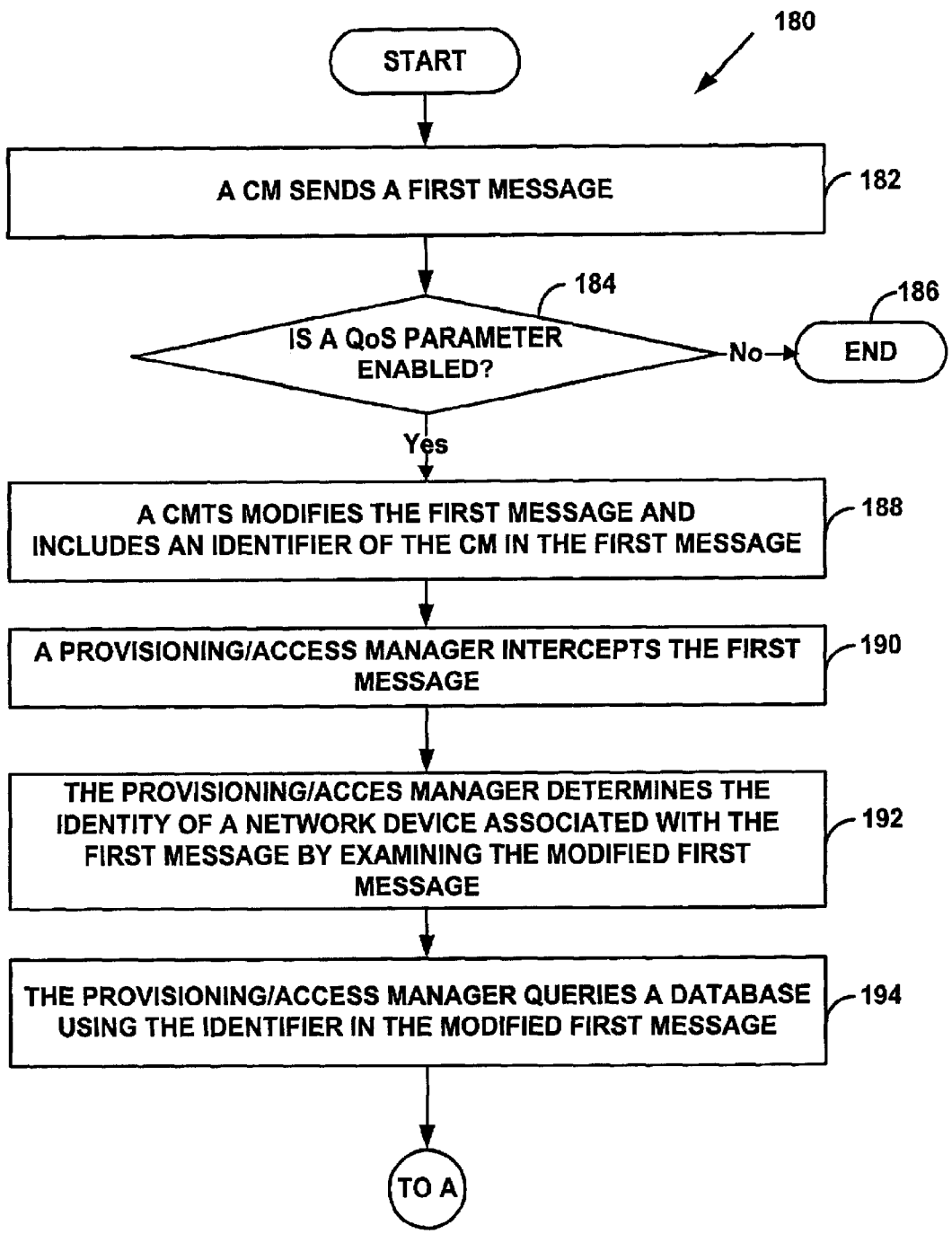

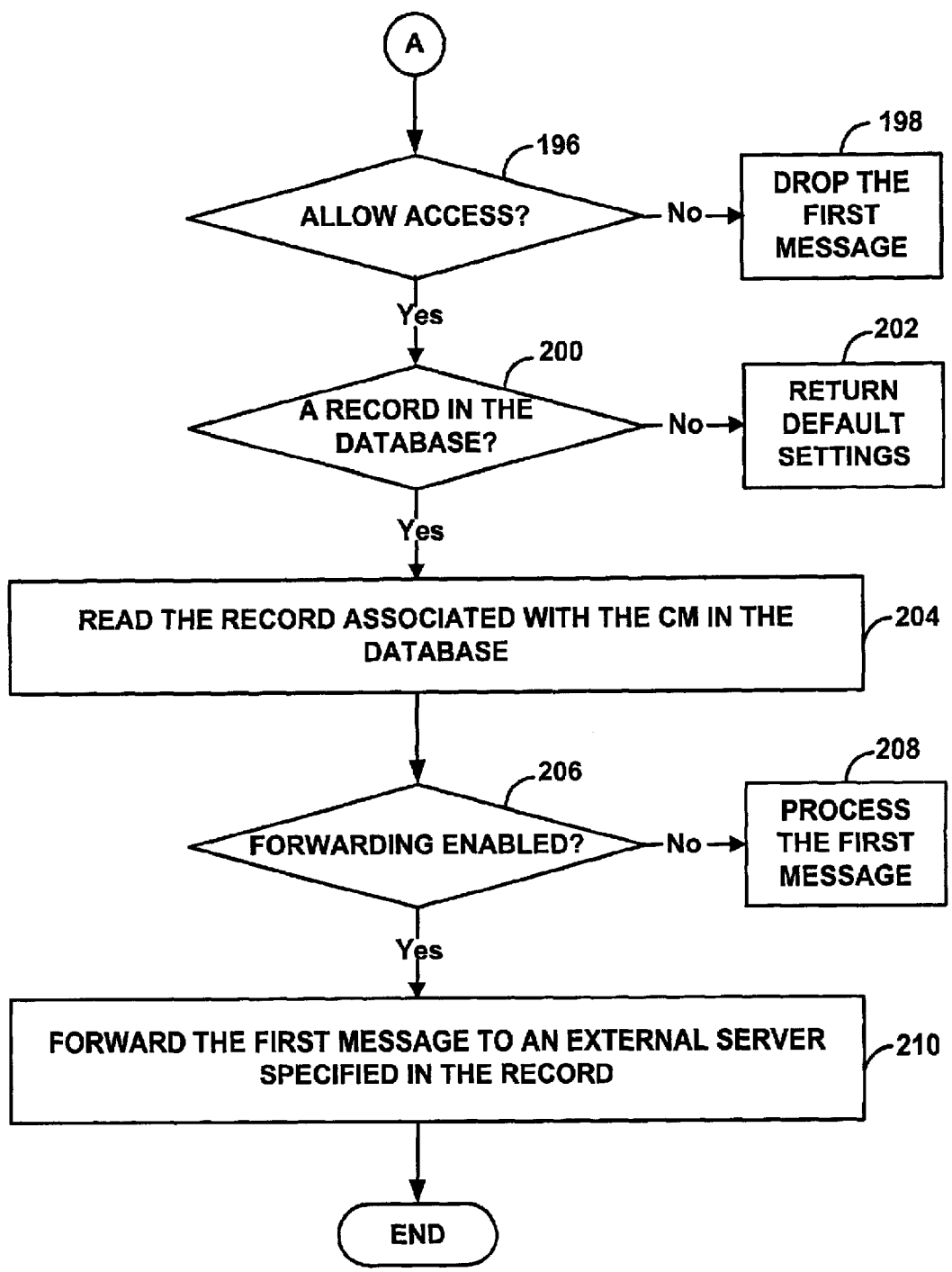

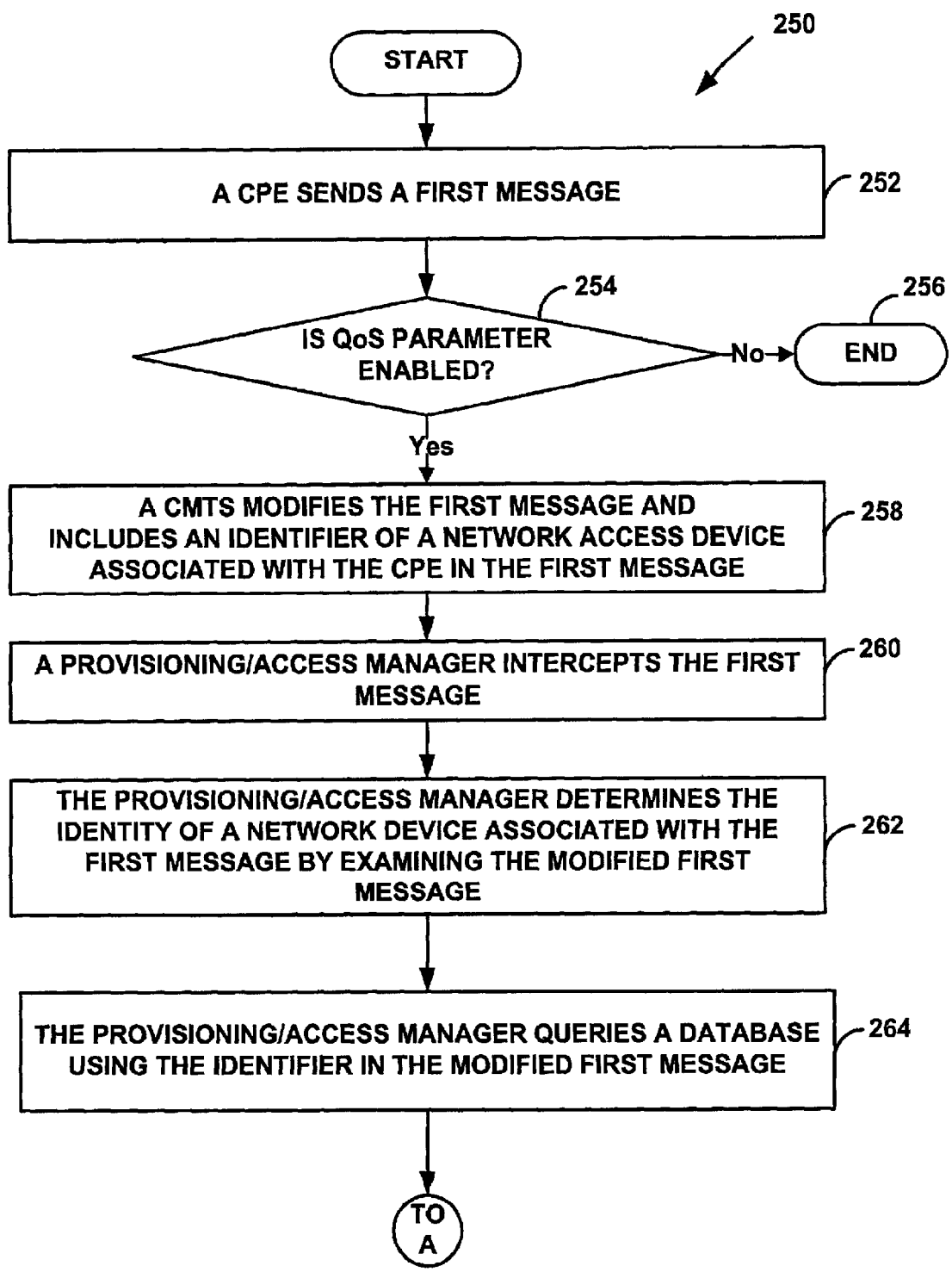

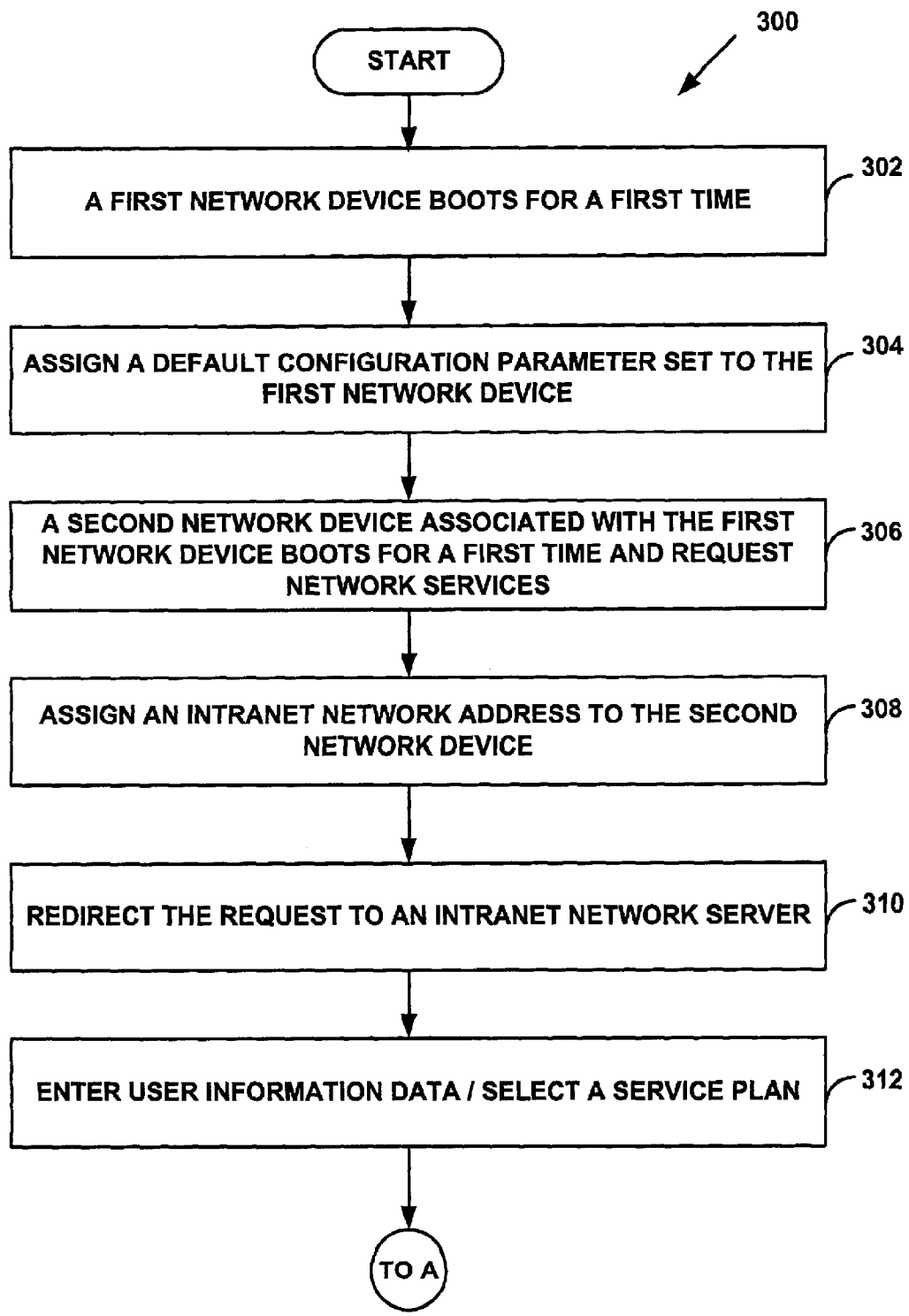

FIGURE 17

| | RULE BUILDER | | |
|---|---|---|---|
| | TWO WAY CM | = | TRUE |
| AND | DOCSIS v1.1 | = | TRUE |
| AND | CONCATENATION SUPPORT | = | TRUE |
| AND | FRAGMENTATION SUPPORT | = | FALSE |
| AND | NUMBER OF TRANSMIT EQUALIZER TAPS | > | EIGHT |
| | | | |
| | | | |

RULE NAME

LOAD BALANCE 1

CAPABILITY      OPERATOR     VALUE

DOCSIS v1.1 ▼     = ▼     TRUE ▼

[ADD CONDITION]     [DELETE CONDITION]

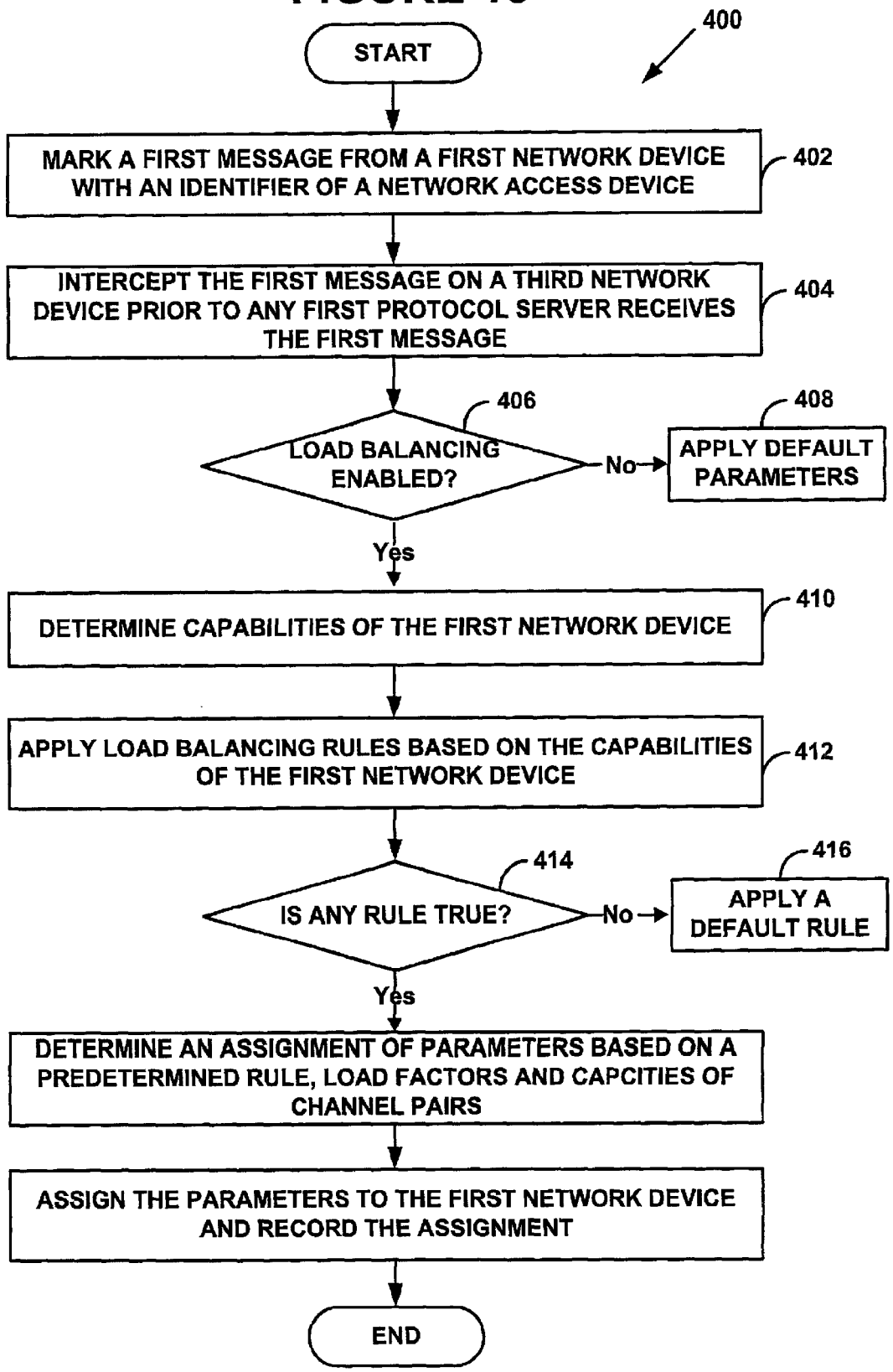

SYSTEM AND METHOD FOR AUTOMATIC LOAD BALANCING IN A DATA-OVER-CABLE NETWORK

FIELD OF THE INVENTION

The present invention relates to communications in computer networks. More particularly, it relates to a method and a system for automatic boot server load balancing in a data-over-cable network.

BACKGROUND OF THE INVENTION

Cable television networks such as those provided by Comcast Cable Communications, Inc., of Philadelphia, Pa., Cox Communications of Atlanta Ga., Time-Warner Cable, of Marietta Ga., Continental Cablevision, Inc., of Boston Mass., and others, provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., Motorola Corporation of Arlington Heights, Ill., Cisco Corporation of San Jose, Calif., Scientific-Atlanta, of Norcross, Ga. and others offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+ Mbps, which is a much larger data rate than can be supported by a modem used over a serial telephone line.

Many cable television networks provide bi-directional cable systems, in which data is sent "downstream", from a "headend" to a customer, as well as "upstream", from the customer back to the headend. The cable system headend is a central location in the cable television network and, further, is responsible for sending cable signals in the downstream direction and receiving cable signals in the upstream direction. An exemplary data-over-cable system with RF return typically includes customer premises equipment such a customer computer, a cable modem, a cable modem termination system, a cable television network, and a data network such as the Internet.

Some cable television networks provide only uni-directional cable systems, supporting only a "downstream" data path, which provides a path for flow of data from a cable system headend to a customer. A return data path via a telephone network, such as a public switched telephone network provided by AT&T and others, (i.e., a "telephone return") is typically used for an "upstream" data path, which provides a path for flow of data from the customer back to the cable system headend. A cable television system with an upstream connection to a telephone network is typically called a "data-over-cable system with telephone return."

An exemplary data-over-cable system with a telephone return typically includes customer premise equipment ("CPE") entities (such as a customer computer or a Voice over Internet. Protocol ("VoIP") device), a cable modem, a cable modem termination system, a cable television network, a public switched telephone network, a telephone remote access concentrator, and a data network (e.g., the Internet). The cable modem termination system and the telephone remote access concentrator combined are called a telephone return termination systems.

If the customer premises equipment entity comprises a telephone or a device capable of sending and receiving video or voice signals, the cable modem has to be capable of sending and receiving such signals. In such cases the cable modem typically comprises an internal media terminal adapter, which provides a network interface functionality that accepts analog voice inputs or video signal and generates IP packets using the Real Time Transport protocol, for instance.

In a bi-directional cable system, when the cable modem termination system receives data packets from the data network, the cable modem termination system transmits received data packets downstream via the cable television network to a cable modem attached to the customer premises equipment entity. The customer premises equipment entity sends response data packets to the cable modem, which sends the response data packets upstream via the cable network. The cable modem termination system sends the response data packets back to the appropriate host on the data network.

In the case of a telephone return system, when the cable modem termination system receives data packets from the data network, the cable modem termination system transmits the received data packets downstream via the cable television network to a cable modem attached to the customer promises equipment entity. The customer premises equipment entity sends response data packets to the cable modem, which sends response data packets upstream via the public switched telephone network to the telephone remote access concentrator. Next, the telephone remote access concentrator sends the response data packets back to the appropriate host on the data network.

When a cable modem used in the cable system with the telephone return is initialized, a connection is made to both the cable modem termination system via the cable network and to the telephone return termination system via the public switched telephone network. As the cable modem is initialized, the cable modem initializes one or more downstream channels via the cable network. Also upon initialization, the cable modem receives a configuration file (a boot file) from a configuration server via a trivial file-transfer protocol ("TFTP") exchange.

The configuration file may include a plurality of configuration parameters encoded in a type-length-value format ("TLV"), for instance. The configuration file may comprise a plurality of Class-of-Service ("CoS") and Quality-of-Service ("QoS") parameters. The Class of Service parameters include, for example, maximum allowed rates, minimum reserved rate, maximum latency and a plurality of other parameters. The Quality of Service parameters include, for example, parameters defining delays expected to deliver data to a specific destination, the level of protection from unauthorized monitoring or modification of data, expected residual error probability, relative priority associated with data and a plurality of other parameters.

Upon receipt of the configuration file, a cable modem may register with a cable modem termination system. To do that, the cable modem may send to the cable modem termination system a registration request message comprising a copy of the configuration file including a plurality of QoS and CoS parameters.

Typically, thousands of cable modems are connected to each cable modem termination system, and also a plurality of customer premises equipment ("CPE") entities such as computers, VoIP compliant devices or telephones are connected to each cable modem. However, there are several problems associated with providing access to subscription services for tens of thousands of cable modems and customer premises equipment entities. At an initialization state or re-initialization state of network equipment, many devices compete simultaneously for dynamically provisioned attributes from the serving network devices. These serving network machines include, for example, servers that provide IP addresses, service authentication, boot configuration files and other policy and management services. There are many standard and proprietary legacy systems in use in large IP networks such as data-over-cable networks, Digital Subscriber Line Access Multiplexer ("DSLAM") service areas, remote access servers ("RAS") or Wireless Internet, all of which rely on a few robust servers to handle the traffic. In such centralized systems, delays from many simultaneous requests can overload the servers as in catastrophic recovery instances or first time initialization process.

Some existing provisioning systems have redundant DHCP or TFTP servers that enable back-up (active-standby or active-active modes). These systems rely on all servers getting a request and duplicate responses from the request input. Thus, these systems do not reduce the tendency for a system overload unless the back-up servers are over designed as very expensive ultra-reliable and fast machines. However, even then, the amount of capability to handle catastrophic recovery with a minimal downtime to users is small.

There are other existing solutions that rely on a distribution of client application software that controls client processes requesting services from the networks. However, the problem with these solutions is the scalability and interoperability. Most commonly used user operating systems have embedded processes for making the service requests. Trying to replace or override these methods can easily create problems with other applications or problems with the operating system itself. It also creates version problems in that co-resident applications and user operating systems change radically over time.

The major disadvantage of the existing solutions is that the existing systems tend to block the initialization process and do not have enough time or knowledge base to execute significant traffic redirection policies in real time.

Thus, it is desirable to develop a standard, reliable and efficient way to provide load-balancing tools preferably integrated into the existing cable modem infrastructure. Further, it is desirable to develop a method and system for a dynamic redirection of client requests for distribution of the load among many servers while minimizing the subscriber down time.

SUMMARY OF THE INVENTION

According to an exemplary embodiment, a method and a system for load balancing are developed.

In one embodiment, a method for load balancing is developed. The method includes receiving a first message on a first network device from a second network device and marking the first message with an identifier of a network access device associated with the second network device. For example, the identifier includes a MAC address of the network access device. In an exemplary embodiment, the first network device intercepts the first message prior to any first protocol server receives the first message. In one embodiment, the first protocol server is a DHCP server.

Further, according to an exemplary embodiment, the third network device includes a set of rules for load balancing of requests between a plurality of channel pairs, where each channel pair has a predetermined resources that can be assigned to a network device having predetermined capabilities. In one embodiment, upon the interception of the first message, the third network device determines capabilities of the second network device. For example, the third network device determines capabilities of the second network device using parameters in the first message. Further, the third network device may query a database to determine whether any configuration information record exists in the database for the second network device. In one embodiment, the database includes a plurality of configuration information records for all registered network devices, and each record is defined using an identifier of a network access device associated with the network device in the record.

Once the third network device determines the capabilities of the second network device, the third network device applies the set of rules to determine an assignment of a predetermined channel pair to the second network device. In one embodiment, the third network device assigns the predetermined channel pair to the second network device based on the determined capabilities of the second network device, a load factor associated with the channel pair and a threshold value defining a capacity of the channel pair.

According to an exemplary embodiment, the channel pair assigned to the second network device is a component of a predetermined service area having a plurality of channel pairs compatible with the channel pair assigned to the second network device. Further, the service area includes a plurality of second protocol servers such as Trivial File Transfer Protocol servers, for example. In one embodiment, the third network device load balances any TFTP requests between the Trivial File Transfer Protocol servers in the service area.

In one embodiment, a data-over-cable system for load balancing of requests from network devices is developed. The exemplary system includes a first network device for marking a first message from a second network device with an identifier of a network access device and a third network device for load balancing of a request in a first message prior to any first protocol server receiving the first message. According to an exemplary embodiment, the first message is a DHCP message, and a first protocol server is a DHCP server. In one embodiment, once the third network device intercepts the first message, the third network device determines capabilities of the second network device, applies a set of load balancing policy rules to determine the assignment of the second network device to a predetermined channel pair. In one embodiment, the third network device determines the assignment of the channel pair to the second network device based on the capabilities of the second network device, a load factor associated with the channel pair and a threshold value defining a capacity of the channel pair.

In one embodiment, each load balancing policy rule includes at least one condition defining predetermined capabilities of a network device and maps to a predetermined group of channel pairs. Then, based on load factors and capacities of each channel pair, the third network device assigns the second network device to one of the channel pairs from the predetermined group.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which:

FIG. 7 is an exemplary dialog box that a system administrator uses to manage configuration files.

FIG. 8 is an exemplary dialog box that a system administrator uses to manage class of service settings;

FIG. 9 is an exemplary dialog box that a system administrator uses to manage a filtering mechanism of network devices on a data-over-cable system;

FIG. 10 is an exemplary dialog box that a system administrator uses to manage forwarding of messages on a data-over-cable network;

FIG. 11 is an exemplary dialog box that a system administrator uses to manage and set up service wide options;

FIG. 12 is a flow chart illustrating an exemplary method for provisioning and access managing of a network device;

FIGS. 13A and 13B are a flow chart illustrating an exemplary method for provisioning and access managing of a cable modem;

FIGS. 14A and 14B are a flow chart illustrating an exemplary method for provisioning and access managing of customer premises equipment;

FIGS. 16A and 16B are a flow chart illustrating an exemplary method for automated provisioning and configuring a network device;

FIG. 17 is an exemplary dialog box that a system administrator uses to set up and manage rules according to an exemplary embodiment;

FIG. 18 is a flow chart illustrating an exemplary method for load balancing according to an exemplary embodiment.

DETAILED DESCRIPTION OF AN EXEMPLARY EMBODIMENT

Exemplary data-over-cable system

Figure 1:
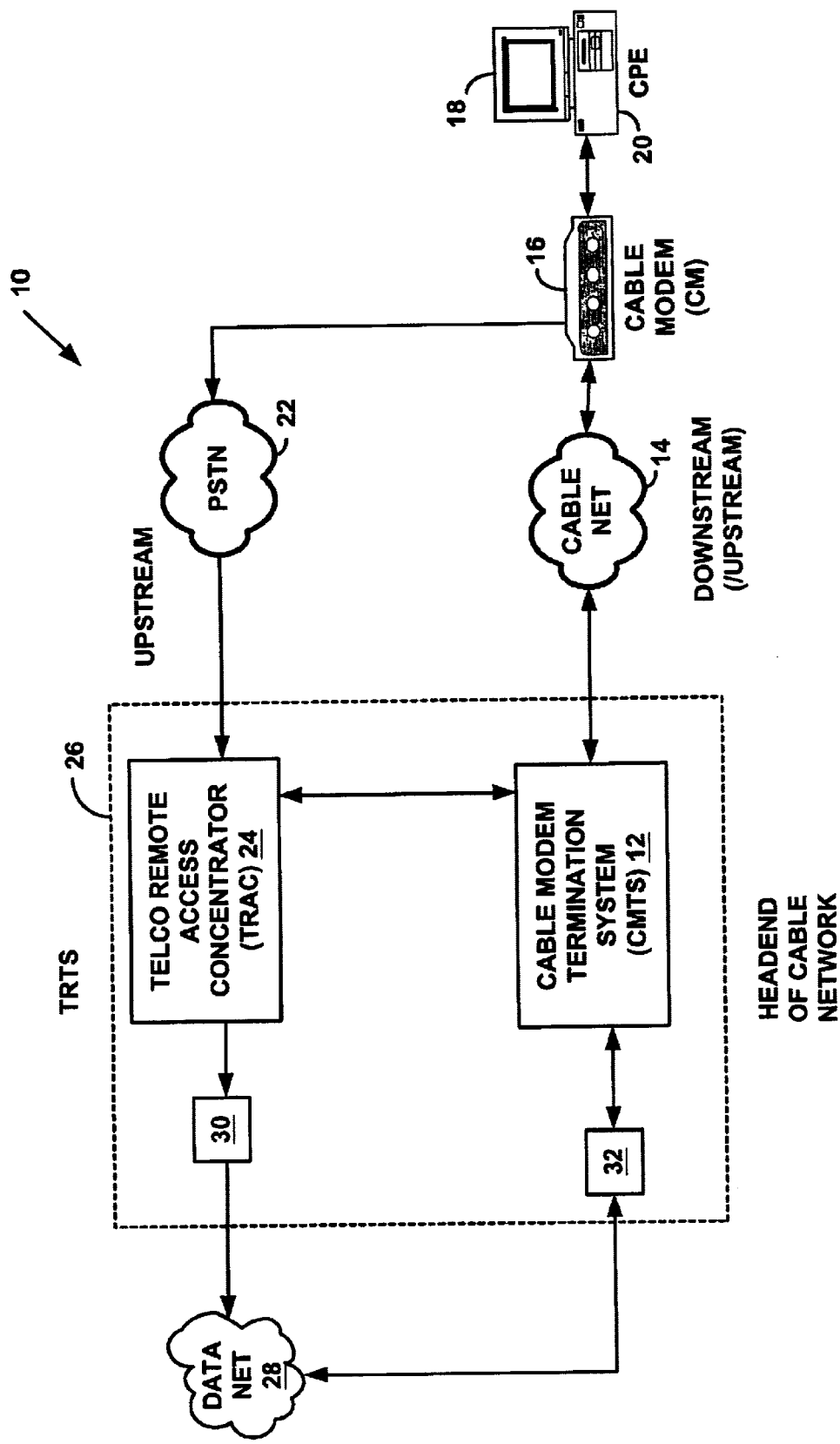
FIG. 1 is a block diagram illustrating a cable modem system in which exemplary embodiments of the present invention may be applied.

FIG. 1 is a block diagram illustrating an exemplary data-over-cable system 10. The data-over-cable system 10 may be a bi-directional cable system supporting a downstream data flow and an upstream data flow to and from a cable television network "headend" from and to a customer premises equipment entity such as a personal computer, for instance. The cable television network "headend" is a central location responsible for sending cable signals in a downstream and an upstream direction. In a bi-directional cable system, customer premises equipment entities or a cable modem may have an upstream connection to a cable modem termination system via a cable television connection, a wireless connection, a satellite connection or a different connection by which the cable modem may send data upstream to the cable modem termination system.

Alternatively, the data-over-cable system 10 may be a uni-directional cable system supporting only a downstream data path from a cable television network headend to a customer premises equipment entity, such as a personal computer. In the uni-directional cable system, a return path is typically established via a telephone network ("telephone return"), which provides an "upstream" data path from the customer premises equipment back to the cable television network "headend". In a uni-directional cable system, a cable modem may comprise an integral telephone modem for connecting to a Public Switched Telephone Network ("PSTN") such as a PSTN 22, and the integral telephone modem may be connected to the cable modem for exchanging data.

The data-over-cable system 10 includes a Cable Modem Termination System ("CMTS") 12 connected to a cable television network 14, hereinafter a cable network 14. FIG. 1 illustrates one CMTS 12. However, the data-over-cable system 10 may include multiple CMTS 12. Further, according to an exemplary embodiment, the CMTS 12 and any other network entities that will be described in the following paragraphs may be duplicated in a serial or a parallel arrangement to provide a back-up in case of failure.

In the exemplary embodiment of the present invention, the CMTS 12 may be a Total Control hub by 3Com Corporation of Santa Clara, Calif., with a cable modem termination unit. A Total Control hub is a chassis with multiple networking cards connected by a common bus. However, the CMTS 12 could also be another network server such as a network server by Cisco Systems of San Jose, Calif., for instance.

The cable network 14 may be a cable television network such as one provided by Comcast Cable Communications, Inc., of Philadelphia, Pa., Cox Communications of Atlanta, Ga., or Time-Warner Cable, of Marietta, Ga., for instance.

A cable modem ("CM") 16 is connected to the cable network 14 with a downstream cable connection. The cable modem may be provided by 3Com Corporation of Santa Clara, Calif., or Motorola Corporation of Arlington Heights, Ill., for instance.

In the exemplary embodiment, the data-over-cable system 10 operates according to a set of specifications, one of which is the Data Over Cable Service Interface Specification ("DOCSIS"), published by Cable Television Laboratories. The DOCSIS standards may be found on the World Wide Web at the Universal Resource Locator ("URL") "www.cablemodem.com." As known in the art, the DOCSIS specification defines interface requirements for cable modems involved in a high speed data distribution over cable television networks. Further, the data-over-cable system 10 may be Packet Cable specifications compliant. The Packet Cable standards may be found on the World Wide Web at the URL "www.packetcable.com." The Packet Cable specifications define mechanisms required for supporting voice and video transmission over cable systems. If the data-over-cable system 10 is Packet Cable specification compliant, the CM 16 may comprise an internal media terminal adapter, or a media terminal adapter may otherwise be provided in communications with the CM 16. The media terminal adapter may provide a network interface functionality for transmitting voice and video signals and for converting analog voice inputs or video signals to P packets using, for instance, the Real Time Transport protocol.

Furthermore, if the data-over-cable system 10 is Packet Cable Specification compliant, the data-over-cable system 10 may include a plurality of additional network devices such as a call management server and a gate controller, for instance. The call management server may enable the media terminal adapter to establish multimedia sessions including voice communications applications such as "IP telephony" or "VoIP". The gate controller may be used to perform authorization and authentication checks for users attempting to connect to the CMTS 12.

FIG. 1 illustrates one CM 16 connected to the CMTS 12. However, typical data-over-cable systems include tens or hundreds of thousands of CMs 16 connected to the CMTS. 12. In addition, as shown in FIG. 1, the CM 16 is connected to a CPE entity 18 such as a personal computer system, a VoIP device or a telephone, for instance. The CM 16 may be connected to the CPE entity 18 via a Cable Modem-to-CPE Interface ("CMCI") 20. FIG. 1 illustrates one CPE entity 18. However the CM 16 is typically coupled to multiple CPE entities.

If the data-over-cable system 10 is a bi-directional data-over-cable system, the CM 16 may have an upstream and downstream connection to the CMTS 12 via a cable television connection, a wireless connection or a satellite connection, for instance. FIG. 1 illustrates an exemplary upstream and downstream connection to the CMTS 12 via the cable network 14. In such embodiment, the CMTS 12 may still also provide data from the PSTN 22 to the CM 16 or the CPE entity 18.

In a downstream direction of a bi-directional data-over-cable system, a cable system typically has a passband with a lower edge between 50 MHz and 54 MHz and an upper edge between 300 MHz to 864 MHz. However, the data-over-cable system 10 is not limited to such frequencies, and frequencies in data-over-cable system may be implementation dependent. In the upstream direction, the cable system may have an operating frequency passband range from 5 MHz to 30 MHz or 5 MHz to 40 MHz, for instance.

As mentioned above, the cable system 10 may be a unidirectional cable system. In a unidirectional cable system, the CM 16 is connected to the PSTN 22 or other such network, which provides an upstream telephone connection. The upstream telephone connection may be a standard telephone line connection such as an Integrated Services Digital Network ("ISDN") connection, an Asymmetric Digital Subscriber Line ("ADSL") connection or a wireless connection, for instance.

In that arrangement, the PSTN 22 may be connected to a Telephone Remote Access Concentrator ("TRAC") 24. In the data-over-cable system having an upstream telephone connection, the TRAC 24 may be a Total Control telephone hub by 3Com Corporation of Santa Clara, for instance. However, the TRAC 24 could also be a telephone hub manufactured by a different company, or could take still other forms.

The combination of the CMTS 12 and the TRAC 24 is called a "Telephone Return Termnination System" ("TRTS") 26. The TRTS 26 is illustrated as a dashed box in FIG. 1. The CMTS 12 and the TRAC 24 may be at a "headend" of the cable system 10. Alternatively, for instance, the TRAC 24 may be located in a different location and may have routing associations with the CMTS 12. The cable system 10 may also include a plurality of servers such as operations servers, administrative servers or maintenance servers (not shown). Further, the CMTS 12 may connect a plurality of access points to the data-over-cable system 10. Additionally, the plurality of access points may be connected to cable headend access points. Such configurations may be "one-to-one", "one-to-many", or "many-to-many", and may be interconnected to other Local Area Networks ("LANs") or Wide Area Networks ("WANs").

The data-over-cable system 10 may comprise a plurality of network interfaces. As shown in FIG. 1, the TRAC 24 is connected to a data network 28 (e.g. the Internet, an intranet, a LAN or a WAN, for instance) via a TRAC-Network System Interface 30 ("TRAC-NSI"). The CMTS 12 is connected to the data network 28 via a CMTS-Network System Interface ("CMTS-NSI") 32.

Further, the data-over-cable system 10 may comprise a policy/authorization server 38 in communication with the CMTS 12. The authorization/policy server 38 may manage overall policies with an administrative domain such as an Internet service provider, for instance. The CMTS 12 may also comprise an internal authorization module that may serve as a policy enforcement point, for instance.

The system 10 may also comprise a bandwidth manager 36 in communication with the CMTS 12. The bandwidth manager 36 may detect network trends, measure network response time, generate CoS and QoS reports, allocate bandwidth and/or keep records of allocated and available bandwidth.

The present invention is not limited to use within the data-over-cable system illustrated in FIG. 1. More, fewer or different components, connections and interfaces could also be used. Further, the arrangements described herein are shown for purposes of illustration only, and those skilled in the art will appreciate that other arrangements and other elements, such as interfaces or functions, whether or not known in the art, can be used instead, and some elements may be omitted altogether. Additionally, as in most communications applications, those skilled in the art will appreciate that many of the elements described herein are functional entities that may be implemented as discrete components or in conjunction with other components, in any suitable combination and location.

Further, as mentioned above, network entities in the data-over-cable system 10 may be duplicated to provide a back-up in case of failure of one or more network entities. For instance, the network entities may be duplicated in parallel or in series. In a parallel arrangement, for instance, the CMTS 12 comprising an internal authorization/policy server 38 and an internal bandwidth manager 36 may be duplicated. The CMTS 12 and a duplicated CMTS 12' (not shown) may operate simultaneously, with one of them active and the other one in a "standby" state. In such an arrangement, the two units may communicate using a "keep alive" signal, for instance. Thus, if the primary CMTS 12 fails, the redundant CMTS 12' may immediately start operating, and, ideally, there is no loss of service.

In another exemplary embodiment providing a back-up system, redundant units may operate in a serial manner. In the serial arrangement, units may be cross-connected with a heart-beat controlled shunt on ports. Further, in the serial arrangement, both units may be active, as opposed to a primary device being in an active state and a redundant device being in a standby state, as in the parallel arrangement. In another exemplary embodiment of the present invention, any individual integral components or groups of components may be duplicated.

An operating environment for each CMTS 12, CM 16, CPE 18, TRAC 24 and other network entities of an exemplary embodiment may include a processing system with at least one high speed processing unit and a memory system. In accordance with the practices of persons skilled in the art of computer programming, the present invention is described below with reference to acts and symbolic representations of operations or instructions that are performed by the processing system, unless indicated otherwise. Such acts and operations or instructions could be referred to as being "computer-executed", "processing unit executed", or the like.

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations may be physical locations that could have particular electrical, magnetic, optical, or organic properties for maintaining data bits.

The data bits may also be maintained on a computer readable medium such as magnetic disks, optical disks, organic disks, and any other volatile or non-volatile mass storage system readable by the processing unit, for instance. The computer readable medium may include cooperating or interconnected computer readable media, which may exist exclusively on the processing system or may be distributed among multiple interconnected processing systems that may be local or remote to the processing system.

Network device protocol stack

Figure 2:
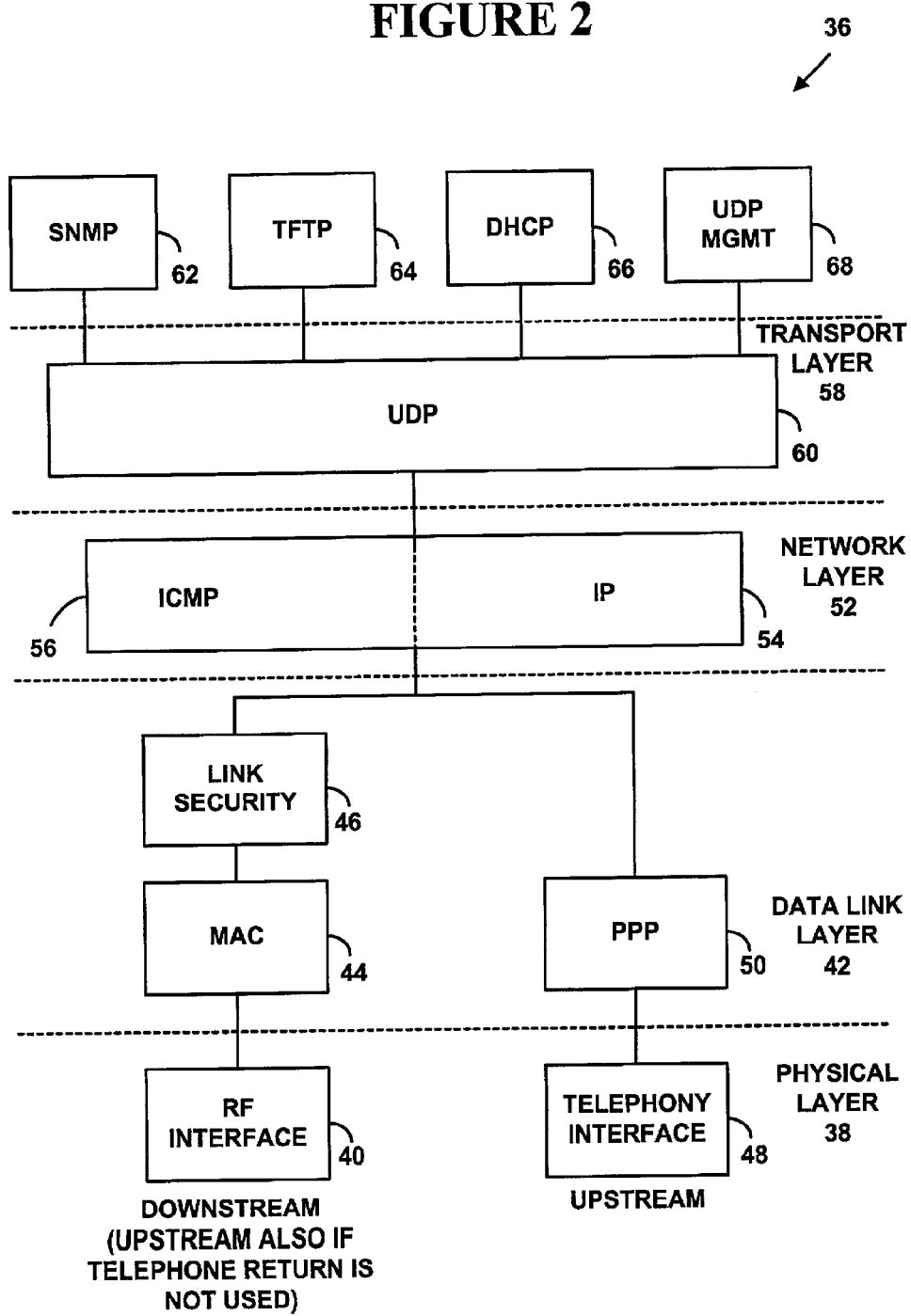
FIG. 2 is a block diagram illustrating a protocol stack for a data-over-cable system.

FIG. 2 is a block diagram illustrating an exemplary protocol stack 36 for network devices in the data-over-cable system 10. In an exemplary embodiment of the present invention, network entities in the data-over-cable system 10 may be DOCSIS compliant. However, other standards may also be used, and the present invention is not limited to DOCSIS compliant network entities.

FIG. 2 illustrates downstream and upstream protocols used in the CM 16, for instance. As known in the art, the Open System Interconnection ("OSI") model may be used to describe computer networks. The OSI model consists of seven layers including, from lowest to highest, a physical layer, a data-link layer, a network layer, a transport layer, a session layer, a presentation layer and an application layer. The physical layer transmits bits over a communication link. The data-link layer transmits error free frames of data. The network layer transmits and routes data packets.

In bi-directional data-over cable systems, the CM 16 is connected to the cable network 14 in a physical layer 38 via a Radio Frequency ("RF") Interface 40. In an exemplary embodiment of the present invention, for a downstream data transmission, the RF Interface 40 may have an operation frequency range of 50 Mega-Hertz ("MHz") to 1 Giga-Hertz ("GHz") and a channel bandwidth of about 6 to 8 MHz. However, other operation frequencies may also be used, and the invention is not limited to these frequencies. For an upstream transmission the RF Interface 40 may have an operation frequency range of about 5 MHz to 50 MHz. Further, the RF Interface 40 may use a signal modulation method, such as Quadrature Amplitude Modulation ("QAM"). As known in the art, the QAM is used as means for encoding digital information over radio, wire, or fiber optic transmission links. The QAM is a combination of amplitude and phase modulation and is an extension of a multiphase phase-shift-keying. The QAM may have any number of discrete digital levels typically including 4, 16, 64 or 256 levels. In an exemplary embodiment, QAM-64 may be used in the RF Interface 40. However, other operating frequencies and modulation methods could also be used, such as a Quadrature Phase Shift Keying ("QPSK") modulation, for instance. Further, the RF Interface 40 can also be used in a cable system with a telephone return.

In a data-over-cable system with a telephone return employed for an upstream connection, the CM 16 may be connected to the PSTN 22 in the physical layer via a telephone interface 48. In an exemplary embodiment, the telephony interface may operate in accordance with one of the standards of the International Telecommunications Union-Telecommunication ("ITU-T") Standardization Sector. The telephone interface 48 may use the ITU-T V.90 standard, for instance. As known in the art, the ITU-T V.90 standard is commonly used in a data link layer of modem communications, and it currently allows data rates as high as 55,600 bits-per-second ("bps"). However, the telephone interface 48 may also operate according to other communications standards, such as V.32 standard, V.34 standard or V.90 standard, for instance. Further, the telephone interface 48 could also be an Asymmetric Subscriber Link ("ADSL") interface, an Integrated Services Digital Network ("ISDN") interface or a wireless interface, for instance.

Above the RF Interface 40, there is a data link layer comprising a Medium Access Control ("MAC") layer 44. As known in the art, the MAC layer 44 controls access to a transmission medium via the physical layer 38. The MAC layer 44 may use a protocol described in IEEE 802.14. However, other MAC layer protocols could also be used, such MCNS MAC layer protocol, for instance. Above the MAC layer 44 may be a link security protocol stack 46. The link security protocol stack 46 prevents unauthorized users from making a data connection from cable network 14.

A Point-to-Point Protocol ("PPP") layer 50 is in the data link layer 42 and above the telephone interface 48. As known in the art, the PPP layer encapsulates network layer datagrams over a serial communication link. More information on the PPP protocol may be found on the World Wide Web at the URL "www.ietf.org" in a Request for Comments ("RFC"), RFC-1661.

A network layer 52 is above both the downstream protocol layer and the upstream protocol layer. The network layer 52 comprises an Internet Protocol ("IP") layer 54 and an Internet Control Message Protocol ("ICMP") layer 56. The IP layer 54 corresponds to the OSI layer 3, which is the network layer, but, typically, is not defined as part of the OSI model. As known in the art, IP is a routing protocol designed to route traffic within a network or between networks. More information on the IP protocol may be found at the URL "www.ietf.org" in RFC-791. The ICMP layer 56 is used for network management. The ICMP provides a plurality of functions, such as error reporting, reachability testing (e.g., "pinging"), congestion control, route-change notification and performance or subnet addressing, for instance. More information on ICMP may be found at the URL "www.ietf.org" in RFC-792.

A transport layer 58 is above the network layer 52. The transport layer 60 comprises a User Datagram Protocol ("UDP") layer 60, which approximately corresponds to the OSI layer 4, the transport layer. As known in the art, UDP provides a connectionless mode of communications with datagrams. More information on the UDP layer 60 may be found at the URL "www.ietf.org" in RFC-768. However, the transmission layer 58 is not limited to the User Datagram Protocol and other protocols, such as a Transmission Control Protocol ("TCP"), for instance. More information on the TCP may be found at the URL "www.ietf.org" in RFC-793.

Above the transport layer 58, there are a Simple Network Management Protocol ("SNMP") layer 60, a Trivial File Transfer Protocol ("TFTP") layer, a Dynamic Host Configuration Protocol ("DHCP") layer 66 and a UDP manager 68. The SNMP layer 60 is used to support network management functions. More information on the SNMP layer may be found at the URL "www.ietf.org" in RFC-1157. The TFTP layer 64 is a file transfer protocol, which is typically used to download files and configuration information. More information on the TFTP layer 64 may be found at the URL "www.ietf.org" in RFC-1350. The DHCP layer 66 is a protocol for passing configuration information to host on the IP network 54. More information on the DHCP layer 66 may be found at the URL "www.ietf.org" in RFC-1541, RFC-2131 and RFC-2132. The UDP manager 68 distinguishes and routes packets to an appropriate service.

However, more, fewer, or different protocol layers could be used in the dataover-cable system 10.

According to an exemplary embodiment of the present invention, the CM 16 may support transmission and reception of IP datagrams as specified by RFC-791. The CM 16 may be also configured to filter IP datagrams with IP addresses assigned to the CM 16 or CPE 18. Further, the CMTS 12 and the TRAC 24 may also perform filtering of IP datagrams.

During the initialization of the CM 16, the CMTS 12 transmits to the CM 16 a Termination System Information ("TSI") message, which is a MAC management message. The CMTS 12 may use the TSI message to report to the CM 16 whether or not a bi-directional system is used, for instance. Further, the TSI message may be used to provide the CM 16 with information about the status of the CMTS 12.

Figure 3:
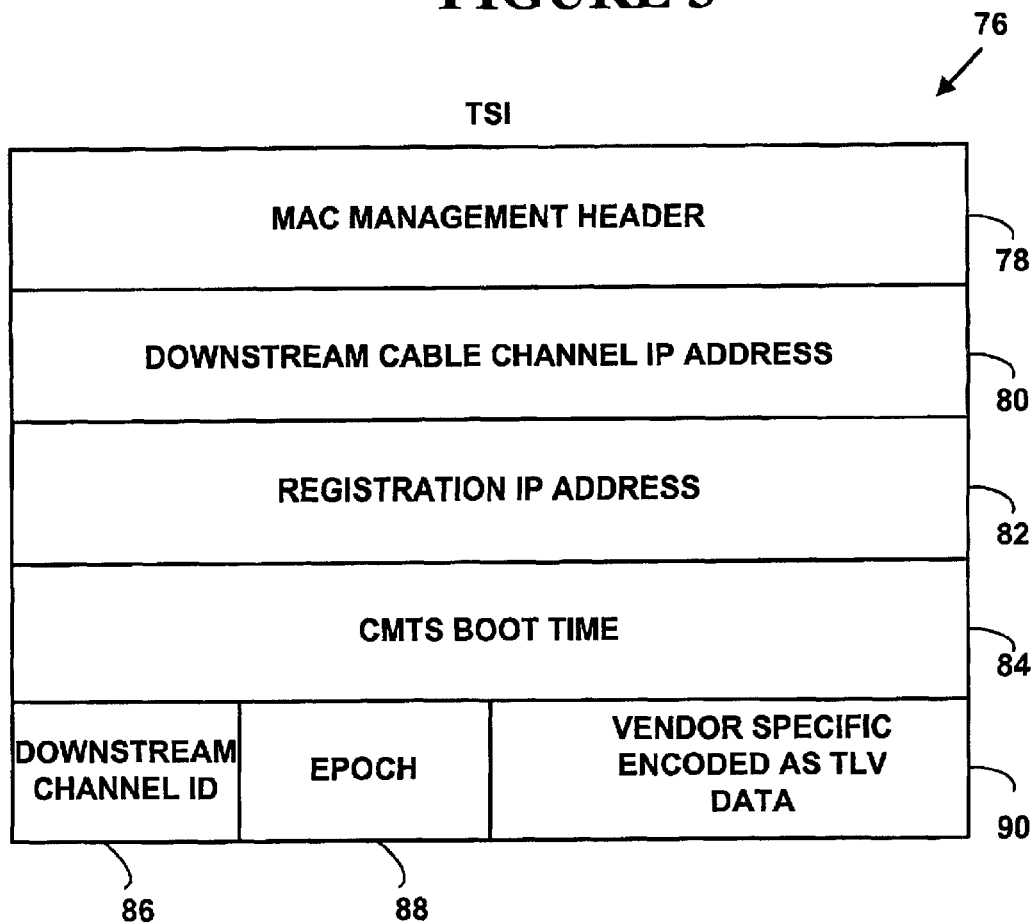
FIG. 3 is a block diagram illustrating a Termination System Information message structure.

FIG. 3 is a block diagram illustrating a structure of an exemplary TSI message 76. The TSI message structure 76 comprises a plurality of fields, such as a MAC management header 78, a downstream cable channel IP address 80, a registration IP address 82, a CMTS boot time 84, a downstream channel identifier 86, an epoch time 88 and vendor specific encoded data 90. However, the TSI message 76 is not limited to these fields, and more, fewer or different fields could also be used in the TSI message 76.

Additionally, during the initialization process, the CM 16 may initiate a Dynamic Host Configuration Protocol ("DHCP") process. The DHCP process is used to provide configuration parameters to hosts on a network such as an IP network, for instance. The DHCP process provides two main services to network clients such as CMs or CPE entities. First it allocates IP network addresses to clients and, second, the DHCP process provides configuration parameters for network entities.

Figure 4:
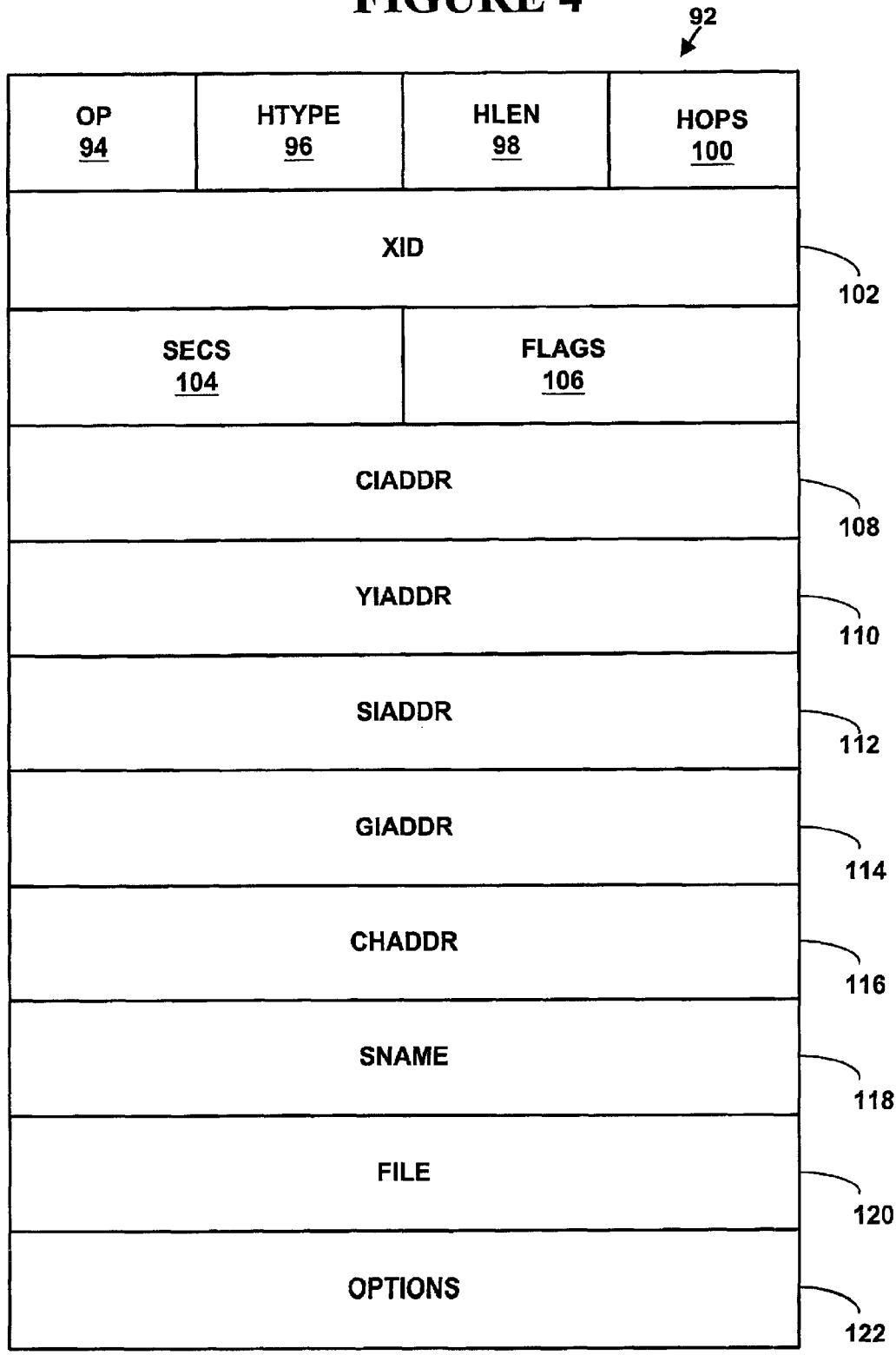
FIG. 4 is a block diagram illustrating a Dynamic Host Configuration Protocol message structure.

FIG. 4 is a block diagram illustrating an exemplary DHCP message structure 92. The format of the DHCP message structure 92 is based on a format of BOOTstrap Protocol ("BOOTP") messages described in RFC-951 and RFC-1542, incorporated herein by reference. From a network host client's point of view, the DHCP is an extension of a BOOTP mechanism.

This property allows the existing BOOTP clients to communicate with DHCP servers without requiring any changes in to network host clients' BOOTP initialization software.

To capture a BOOTP relay agent behavior described as part of the BOOTP specification and to allow interoperability of existing BOOTP clients with the DHCP servers, a DHCP server uses a BOOTP message format. Further, using the BOOTP relay agents eliminates the necessity of using a DHCP server on each physical network segment.

DHCP 66 message structure 92 includes an operation code field 94 ("op"), a hardware address type field 96 ("htype"), a hardware address length field 98 ("hlen"), a number of hops field 100 ("hops"), a transaction identifier field 102 ("xid"), a seconds elapsed time field 104 ("secs"), a flags field 106 ("flags"), a client IP address field 108 ("ciaddr"), a your IP address field 110 ("yiaddr"), a server IP address field 112 ("siaddr"), a gateway/relay agent IP address field 114 ("giaddr"), a client hardware address field 116 ("chaddr"), an optional server name field 118 ("sname"), a boot file name 120 ("file") and an optional parameters field 122 ("options"). Descriptions for an exemplary DHCP message 92 fields are shown in Table 1.

TABLE 1

| DHCP Parameter | Description |
| --- | --- |
| OP 94 | Message op code/message type. 1=BOOTREQUEST, 2=BOOTREPLY. |
| HTYPE 96 | Hardware address type (e.g., '1' = 10 Mps Ethernet). |
| HLEN 98 | Hardware address length (e.g. '6' for 10 Mbps Ethernet). |
| HOPS 100 | Client sets to zero, optionally used by relay-agents when booting via a relay-agent. |
| XID 102 | Transaction ID, a random number chosen by the client, used by the client and server to associate messages and responses between a client and a server. |
| SECS 104 | Filled in by client, seconds elapsed since client started trying to boot. |
| FLAGS 106 | Flags including a BROADCAST bit. |
| CIADDR 108 | Client IP address; filled in by client in DHCPREQUEST if verifying previously allocated configuration parameters. |
| YIADDR 110 | 'Your'(client) IP address. |
| SIADDR 112 | IP 54 address of next server to use in bootstrap; returned in DHCPOFFER, DHCPACK and DHCPNAK by server. |
| GIADDR 114 | Gateway relay agent IP 54 address, used in booting via a relay-agent. |
| CHADDR 116 | Client hardware address (e.g., MAC layer 44 address). |
| SNAME 118 | Optional server host name, null terminated string. |
| FILE 120 | Boot file name, terminated by a null string. |
| OPTIONS 122 | Optional parameters. |

The DHCP message structure 92 shown in FIG. 4 may be used to discover IP network host interfaces in data-over-cable system 10. A network host client such as the CM 16 may use the DHCP process to dynamically acquire or verify an IP address and network parameters whenever the network parameters may have changed. During a typical use DHCP process, the CM 16 and CPE 18 broadcast a "DHCPDISCOVER" message to receive configuration settings such a configuration file and an IP address for the CM 16 and an IP address for the CPE 18. During the DHCP process, the DHCP servers may respond with DHCPOFFER messages including configuration parameters. Then, the CM 16 or the CPE 18 selects one of the DHCP servers and sends a DHCPREQUEST to the selected server.

Policy Management and Multiple Access Provisioning

According to an exemplary embodiment, a system and method for the cable modem boot file management, IP service classes management, DHCP filtering, DHCP forwarding, CM setting recording and automatic provisioning in the existing data-over-cable system are developed.

Figure 5:
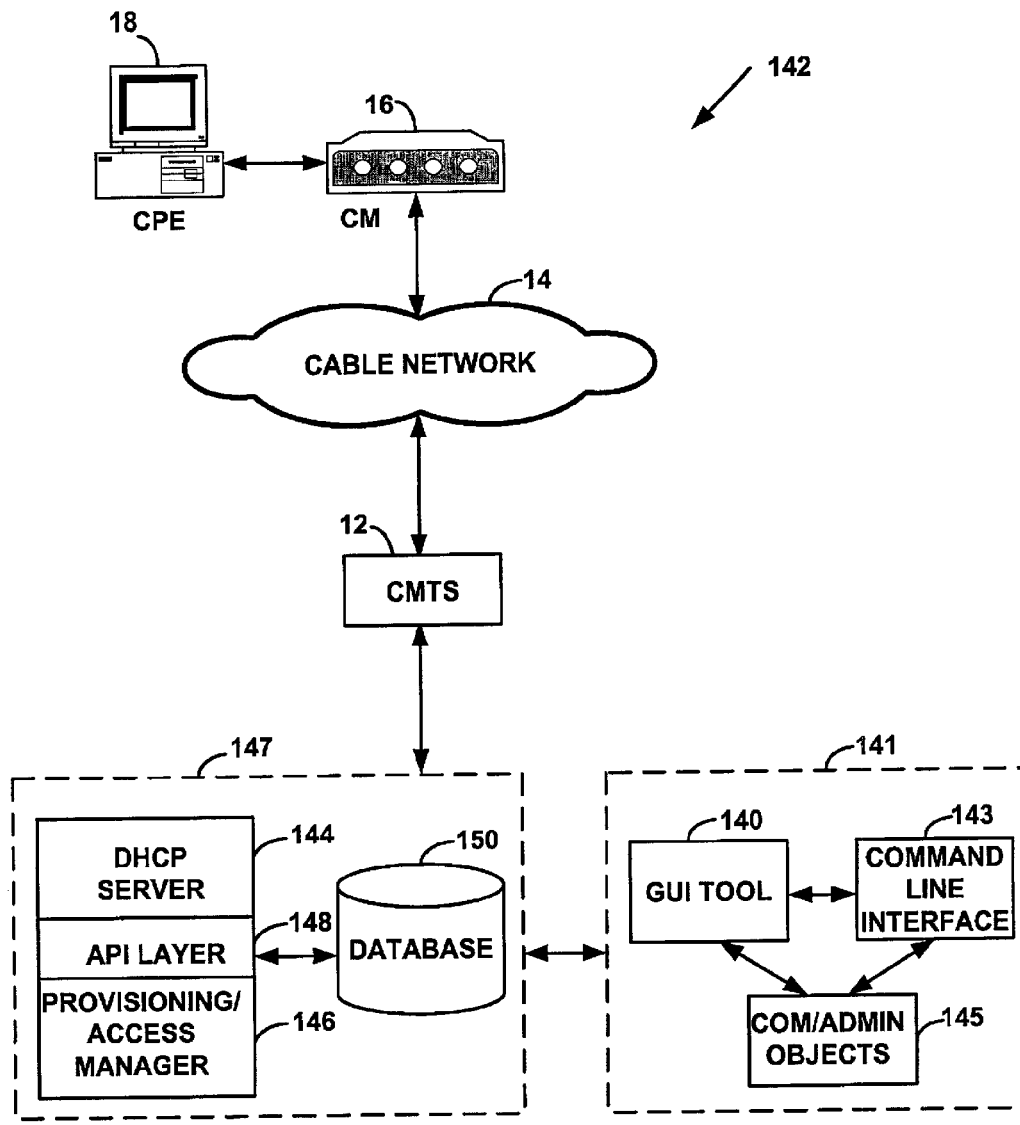
FIG. 5 is a block diagram illustrating an exemplary data-over-cable provisioning and access managing system.

FIG. 5 is a block diagram illustrating an exemplary network system 142 for policy management and multiple access provisioning according to an exemplary embodiment. According to an exemplary embodiment, the network system 142 is a data-over-cable system. However, the present invention is not limited to a data-over-cable system and the exemplary embodiment could be employed in other networks such as a broadband wireless network an Integrated Services Digital network. Further, the exemplary embodiments could be employed in systems where a network device sends data associated with a Point to Point Protocol over Ethernet, Asynchronous Transfer Mode, an Integrated Services Digital, or where a network device sends data over a Digital Subscriber Line, for example. The exemplary data-over-cable system 142 includes the CPE 18, the CM 16, the CMTS 12, a server cluster 147 and an administration tool 141 in communication with the server cluster 147. However, more fewer or equivalent components can also be used. The server cluster 147 includes a DHCP server 144 such as a Windows 2000 DHCP server, an Application Programming Interface ("API") Layer 148, a provisioning/access manager 146 and a database 150. According to an exemplary embodiment, the DHCP server 144 is configured with different scopes for CMs and different scopes for each CPE class of service. Further, the database 150 stores DHCP configuration settings and configuration data for all registered CMs. According to an exemplary embodiment, the administration tool 141 communicates with the server cluster 147 using standard methods such as Open Data Base Connectivity ("ODBC") method for sharing data between databases and other programs. The administration tool 141 includes a Graphical User Interface ("GUI") tool 140, a Command Line Interface ("CLI") 143 and a Component Object Model ("COM") Administration Object API 145. According to an exemplary embodiment, the GUI 140 provides the ability to query, add, delete and modify configuration settings for individual CMs that are classified using a unique CM MAC address for each CM. The CLI 143 provides all GUI administration functional operations through a command line interface. The COM Administration Object API 145 provides the access to the administration functionality and allows for configuring CM boot files, service classes and correlating CM MACs to PC IP addresses.

Network devices for preferred embodiments of the present invention include network devices that can interact with network system 142 based on standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications Union-Telecommunication Standardization Sector ("ITU"), Internet Engineering Task Force ("IETF"), and/or Wireless Application Protocol ("WAP") Forum. However, network devices based on other standards could also be used. DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." IETF standards can be found at the URL "www.ietf.org." The WAP standards can be found at the URL "www.wapforum.org."

According to an exemplary embodiment, a system administrator may manage the data-over-cable system 142 shown in FIG. 5. However, prior to using this system, the administrator is required to define network interface configuration and DHCP options configuration. According to an exemplary embodiment, a set of commands such as a "set dhcp" command may be created on a system for system administrators to enter necessary DHCP options configuration parameters. In one embodiment, the DHCP options configuration parameters may include a two-way CM's gateway interface address ("cmgiaddr") and a CPE gateway interface address ("cpegiaddr"). The "cmgiaddr" corresponds to a name of a cable IP network through which the administrator wants DHCP responses to be routed for downstream transmission to the CM 16, and the "cpegiaddr" corresponds to a name of the cable IP network through which the administrator wants DHCP responses to be routed to CPEs such as the CPE 18. Further, according to an exemplary embodiment, system administrators have the ability to enable and disable policy management and multiple access provisioning system. In one embodiment, a system administrator may set a special QoS parameter such as an "agentinfooption" parameter in order to enable policy management and multiple access provisioning methods associated with the system.

Figure 6:
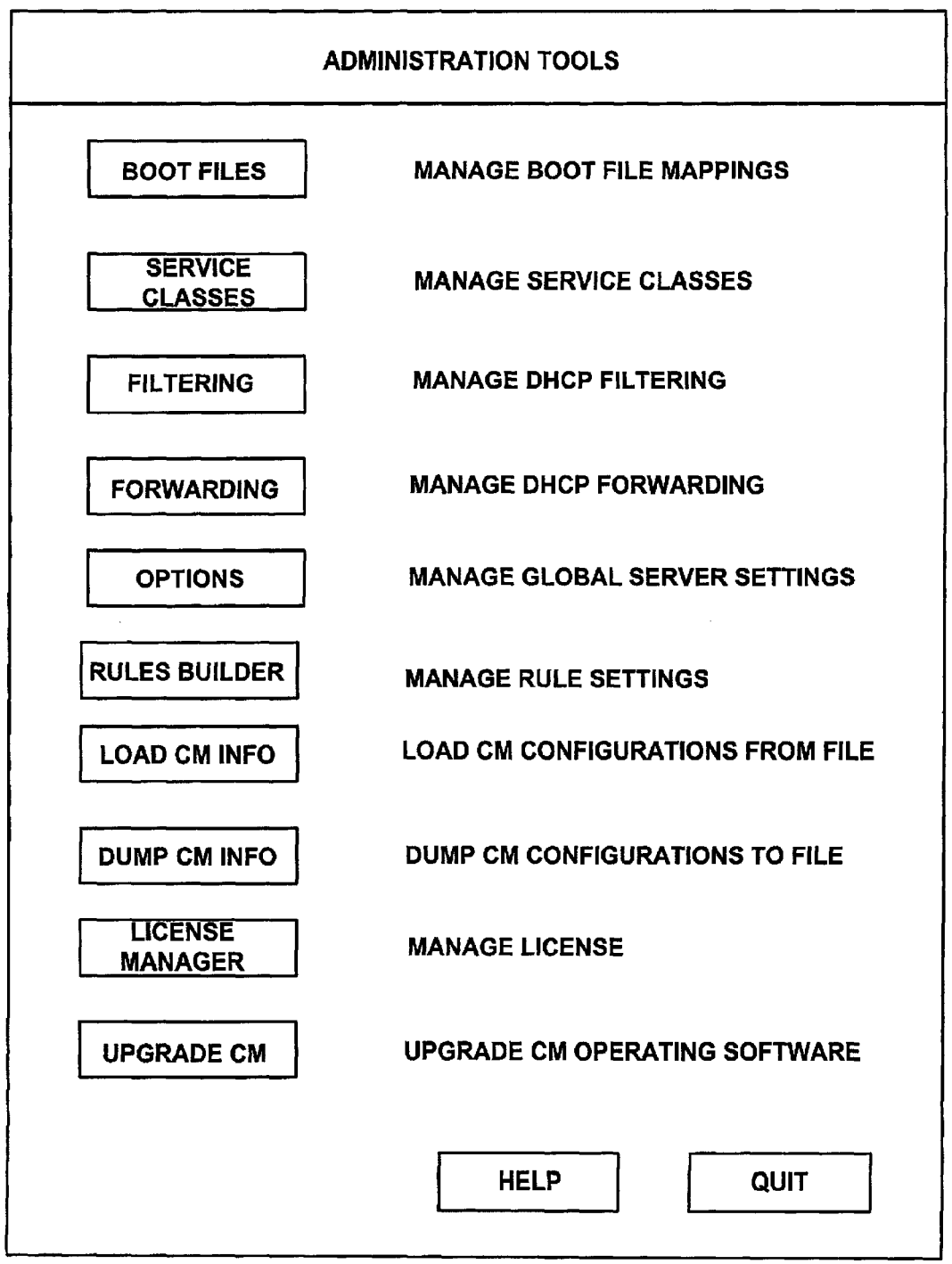
FIG. 6 is an exemplary dialog box that a system administrator uses to administer and manage a provisioning-access manager.

FIG. 6 is an exemplary dialog box that a system administrator uses to administer the provisioning/access manager 146. According to an exemplary embodiment, as described in greater detail in the preceding paragraphs, the system administrator manages: boot file mappings, service classes, DHCP filtering, DHCP forwarding, global service options and load balancing rule definitions. Using the interface, the system administrator can also select one of the graphical selection inputs to load cable modem configuration parameters from a file, to dump cable modem's configuration parameters to a file and to manage a license of the provisioning/access manager 146.

According to an exemplary embodiment, the system administrator may create and manage assignment of boot files to each CM based on MAC network addresses associated with the CMs, so that a CM can be uniquely identified and directed to appropriate configuration settings. Thus, based on a CM's customer service plan, a CM can be assigned a unique boot file that may add, delete, update or restrict network-based features according to the system administrator's settings. In one embodiment, the system administrator may specify a "BootFileID", a "BootFile Path" and may enter a brief description of the boot file via the graphical user interface 140. According to an exemplary embodiment, the "BootFileID" corresponds to a unique identifier of a CM's boot file and is added to the configuration settings when a new CM MAC address is added to the system. The "BootFile Path" is a full path to the boot file located on a TFTP server and, according to an exemplary embodiment this path is inserted into an outgoing DHCP packet for the CM. Table 2 shows an exemplary boot file configuration data FIG. 7 illustrates an exemplary dialog box that a system administrator uses to manage configuration file settings.

TABLE 2

| Boot File ID | TFTP Path | Description |
| --- | --- | --- |
| 1 | black.cfg | Unknown CM default.cfg file |
| 2 | Standard.cfg | Standard CoS.cfg file |
| 3 | gold.cfg | Gold CoS.cfg file |

Further, according to an exemplary embodiment, CPEs in the data-over-cable system 142 can be provisioned so that certain pools of IP addresses have priority over others and different CoS can be mapped to different IP address pools.

As known in the art, the CMTS 12 is configured to have one gateway address "cpegiaddr" for all CPE requests, and such configuration works well if the CMTS 12 has only one downstream for CPE addresses. However, such configuration does not work if the CMTS 12 has multiple downstreams for CPE addresses having different classes of service. Since each CMTS is configured to have one "cpegiadr" for all CPE requests, an IP address corresponding to a desired class of service may be out of the requesting CPE's subnet. According to an exemplary embodiment, a different gateway address (mapped "giaddr") is placed in the incoming DHCP request associated with a CPE based on the class of service required by each CPE. The system administrator may create a set of rules for mapping an incoming "giaddr" (the "cpegiaddr" in the CMTS) to a mapped "giaddr". Table 3 shows an exemplary service class mappings that may be created by the system administrator via the graphical user interface 140 and then stored in the database 150. FIG. 8 is an exemplary dialog box that a system administrator uses to manage class of service settings.

TABLE 3

| Incoming giaddr | Service Class | Mapped giaddr | Subnet Mask | Description |
|---|---|---|---|---|
| 149.112.10.1 | 11 | 149.112.10.1 | 255.255.255.0 | Black service class, unknown CM |
| 149.112.10.1 | 12 | 149.112.11.1 | 255.255.255.0 | Standard service class |
| 149.112.10.1 | 13 | 149.112.12.1 | 255.255.255.0 | Gold service class |

As shown in Table 3, the system administrator sets a plurality of fields while configuring service classes. One of the fields corresponds to an incoming "giaddr", which in an exemplary embodiment corresponds to the "cpegiaddr" defined by the system administrator during setting the DHCP options configuration. Further, the system administrator sets service classes, which are defined by numeric identifiers such as 11, 12 and 13 shown in Table 2. The numeric identifiers do not have to be unique, and the unique key is a combination of an incoming "giaddr" and service class. The mapped "giaddr" field corresponds to a CPE's downstream IP address that is mapped from the incoming "giaddr". The subnet mask field corresponds to a subnet mask for a specific service class.

According to an exemplary embodiment, system administrators may also restrict vendors and versions of the CMs on their networks. In one embodiment, system administrators set MAC prefixes that are allowed on their network. For example, a system administrator may set three byte MAC prefix values. However, the exemplary embodiment is not limited to the three byte MAC prefix values, and other prefix values could also be used such as four byte prefix values, for example. If the filtering is enabled by a system administrator, the provisioning/access manager 146 scans all requests to determine whether or not the first three bytes of the CM MAC address reside in the table defining the allowed MAC prefixes. If the prefix is not found in the database, the packet is dropped and the CM does not receive network services such as an IP address assignment or configuration file assignment. Table 4 shows an exemplary set of MAC prefixes associated with the CMs' MAC addresses that could be set by the system administrator. FIG. 9 illustrates an exemplary dialog box that the system administrator can use to manage and set MAC address prefixes using the graphical user interface tool 140.

TABLE 4

| MAC Prefix | Description |
|---|---|
| 0x00FF11 | Generic 1 |
| 0x801122 | Company X |

Further, according to an exemplary embodiment, a system administrator may set DHCP forwarding functions when configuring the server cluster 147. The DHCP forwarding function allows CPE DHCP requests or both CPE and CM DHCP requests to be forwarded to an external DHCP server. In one embodiment, the DHCP forwarding is based on the CM MAC address. A system administrator may assign to each CM MAC address a provider ID that maps to a DHCP server's IP address. Table 5 illustrates an exemplary set of service provider data that may be set, updated and deleted for a specific CM MAC address by the system administrator. FIG. 10 is an exemplary dialog box that a system administrator uses to manage DHCP forwarding.

TABLE 5

| Provider ID | IP Address | Description |
|---|---|---|
| 3 | 20.21.22.23 | Provider X |
| 4 | 29.21.22.23 | Provider Y |

If the DHCP forwarding function is enabled, the DHCP server 144 simply forwards the DHCP requests to the specified DHCP server and does not attempt further processing of tile packet. According to one embodiment, the default condition is to use the DHCP server 144 that is co-resident with the provisioning/access manager 146. However, if forwarding is enabled, subscriber's requests still have the appropriate policies processed as set for the subscriber and, then, they are forwarded based on the attributes of individual CMs.

In order to set up a network, a system administrator may also configure service-wide options. In one embodiment, the system administrator may manage and set up default is parameters for each non-registered CM. Further, the system administrator may set up global service option parameters. Table 6 shows an exemplary set of parameters with a description of each parameter that could be managed by the system administrator. In one embodiment, the system administrator may disable or enable service-wide option using a graphical user interface that displays to the system administrator the options as graphical selection inputs. FIG. 11 is an exemplary dialog box that a system administrator uses to manage the service-wide options.

TABLE 6

| Parameter | Description |
|---|---|
| Boot File ID for 2 Way CM | Default boot file assigned to 2-way CMs that make DHCP requests but are not yet provisioned in the database 150 |
| Service Class | Default Service Class assigned to CMs that make DHCP requests but are not already provisioned in the database 150 |
| Boot File ID for Telco Return | Default bootfile ID assigned to telco-return CMs that make DHCP requests but are not already provisioned in the database 150 |
| Provider ID | Default provider ID assigned to CMs that use other DHCP servers but are not already provisioned in the database 150 |

TABLE 6-continued

| Parameter | Description |
| --- | --- |
| Enable CM Filtering | Enables or disables DHCP filtering |
| Disable Lease Renewals | This feature is necessary for automatic provisioning. When enabled, all DHCP rebind requests are denied which forces CPEs and CMs to start the process over with a DISCOVER message |
| Enable Service Classes | Enables or disables the Service Class feature |
| Truncate RRAS MAC | Truncates all incoming hardware addresses to 6 bytes, blocking Routing and Remote Access Service ("RRAS") DHCP requests |
| Assign default bootfile | Add unknown CM to the database with the default boot file, service class, and provider ID |
| Default DHCP processing | DHCP server performs stock services for the request and does not add it to the database |
| Drop packet | Drops the packet |
| Disable forwarding | Disables DHCP forwarding to other DHCP servers |
| Forward all requests | Enables forwarding for CPE and CM requests |
| Forward CPE requests only | Enables forwarding for CPE requests only |
| CM/CPE Combo MAC key | The 12-character hex number identifying the CM/CPE combination card CM. The system uses this value to treat CM/CPE combination cards as both a CM and a CPE. This could be left blank. |

In the exemplary data-over-cable network 142, "black-.cfg" (BootFile ID=1), as shown in Table 2, has been defined as the unknown CM Boot File, and the Black service class (Service Class=11), as shown in Table 3, has been defined as the Service Class for the unknown CMs.

Further, according to an exemplary embodiment, the system administrator may save the CMs' configuration settings in the database 150. According to an exemplary embodiment, the configuration settings are saved in the database 150 as text files, and a record is created for each registered CM in the data-over-cable network 142. For example, an exemplary format of a CM record is: "M,0xFFFFFFFFFFFF,2,12,0,0". In the exemplary record, the first field represents an action or control code, where "M" represents an "add/modify" control code and "D" could represent a delete control code. The second field is "0x" followed by 12 hex characters that identify the CM MAC address being added or modified. The third field represents the Boot File ID of the boot file associated with the MAC network address of the CM specified in the second field of the record. In the exemplary embodiment, the record specifies a Boot File ID 2 that, as shown in Table 2, corresponds to a standard boot file. The fourth field represents the Service Class ID (the service class that the CPE associated with the CM in the record should receive). In the exemplary embodiment, the record specifies the service class 12 that, as shown in Table 3, corresponds to a standard service class. The fifth field represents the Provider ID to which DHCP requests should be forwarded, and the sixth field represents Flags.

According to an exemplary embodiment, the system administrator may allow external systems to interact with the DHCP server 144 by creating programs that give an access to the server cluster 147. For example, other servers could interact programmatically with the server cluster 147 by using the COM interface 145. Further, according to an exemplary embodiment, a wrapper such as a C wrapper could be built around the COM 145 to support otller interfaces such as Java Interfaces, for instance. The GUI Tool 140 can be accessed by any COM-accessible language, such as C++, VBScript, JScript or Java, for instance. However, the present invention is not limited to these languages, and other currently existing or later developed languages could also be used.

FIG. 12 is a flow chart illustrating an exemplary method 160 for provisioning and access managing of a network device.

Referring to FIG. 12, at step 162, a first network device receives a first message from a second network device. According to an exemplary embodiment, the first message includes a request for network services. Further, the first message includes a plurality of fields where one of the fields defines an identifier of the second network device. At step 164, the first network device marks the first message with an identifier of a network access device associated with the second network device. In an exemplary embodiment, the first network device maps the identifier of the network access device in a field of the first message that is different that the field including the identifier of the second network device. In one embodiment, the second network device comprises the network access device. In another embodiment, the second network device communicates with the network access device.

At step 166, a third network device intercept the first message. According to an exemplary embodiment, the third network device intercepts the first message prior to any first protocol network server receives the first message. At step 168, the third network device determines the identity of the second network device using the identifiers in the first message. In one embodiment, the second network device comprises the network access device, and in such an embodiment, the identifier of the second network device is the same as the identifier of the network access device inserted in the first message by the first network device. Then, the third network device concludes that the second network device is the network access device. Alternatively, if the second network device communicates with the network access device, the identifiers included in the first message differ, and the third network device concludes that the second network device communicates with the network access device.

At step 170, the third network device manages an assignment of the configuration parameters for the second network device based on the identity of the network access device. In one embodiment, the third network entity queries a database to retrieve a configuration record associated with the identifier of the network access device. According to an exemplary embodiment, the database includes a plurality of configuration records, and each record is developed based on the identifier of the network access device. In one embodiment, the configuration record includes the identifier of the network access device, a configuration file identifier with a path of a configuration file on a second protocol network server and a service provider identifier with an IP address of a first protocol server associated with the service provider. Further, the configuration record includes a class of service parameter associated with any network devices in communication with the network access device.

In one embodiment, if the second network device comprises the network access device, the third network device inserts the path of the configuration file associated with the configuration file identifier so that the second network device receives the preferred configuration file. Alternatively, the third network device forwards the first message to a service provider indicated in the record. Further, if the second network device communicates with the network access device, the third network device uses the class of service parameter to redirect the incoming message and to assign an IP network address to the second network device from a pool of IP addresses associated with the class of service parameter.

In the exemplary embodiment, the first network device comprises a CMTS 12, the network access device is the CM 16 and the third network device is the provisioning/access manager 146. In the exemplary embodiment, the second network device comprises the CM 16 if the second network device is the network access device. Otherwise, the second network device comprises the CPE. Further, the identifier of the network access device comprises a MAC address of the network access device, and the first message comprises a DHCP message. In the exemplary embodiment, the first protocol server comprises a DHCP server, and the second protocol server comprises a TFTP server.

FIGS. 13A and 13B show a flow chart illustrating an exemplary method 150 for configuring a cable modem such as the CM 16 according to an exemplary embodiment. Referring to FIG. 13A, at step 182, the CM 16 sends a first message in the data-over-cable system 142. According to an exemplary embodiment, the first message is a DHCP message such as a DHCP discover message or a DHCP request message, and the first message has a message structure as shown in FIG. 4.

At step 184, a CMTS such as the CMTS 12 determines whether a system administrator has enabled a parameter associated with the QoS policy provisioning method. According to an exemplary embodiment, the CMTS 12 determines whether the "agentinfooption" parameter has been set by the system administrator. If the system administrator has not enabled the "agentinfooptions" parameter, at step 186, the method 180 terminates, and the first message is processed according to a standard DHCP method. However, if the system administrator has enabled the "agentinfooptions" parameter, at step 188, the CMTS 12 modifies the first message. According to an exemplary embodiment, the CMTS 12 marks the first message with an identifier of a network access device. In the exemplary embodiment, the CM 16 is the network access device and, thus, the CMTS 12 marks the first message by placing a MAC netvork address of the CM 16 in the "options" field 120 of the first message and forwards the message.

At step 190, a third network entity such as the provisioning/access manager 146 intercepts the first message. According to an exemplary embodiment, the provisioning/access manager 146 intercepts the first message prior to any network server such as a DHCP server receives the first message. In one embodiment, the provisioning/access manager 146 has a plurality of dynamic link library ("dll") extensions that execute a set of instructions upon the receipt of every DHCP message. In such an embodiment, when the provisioning/access manager 146 receives the first message, the provisioning/access manager 146 calls one or more dll extensions.

Figure 14B:
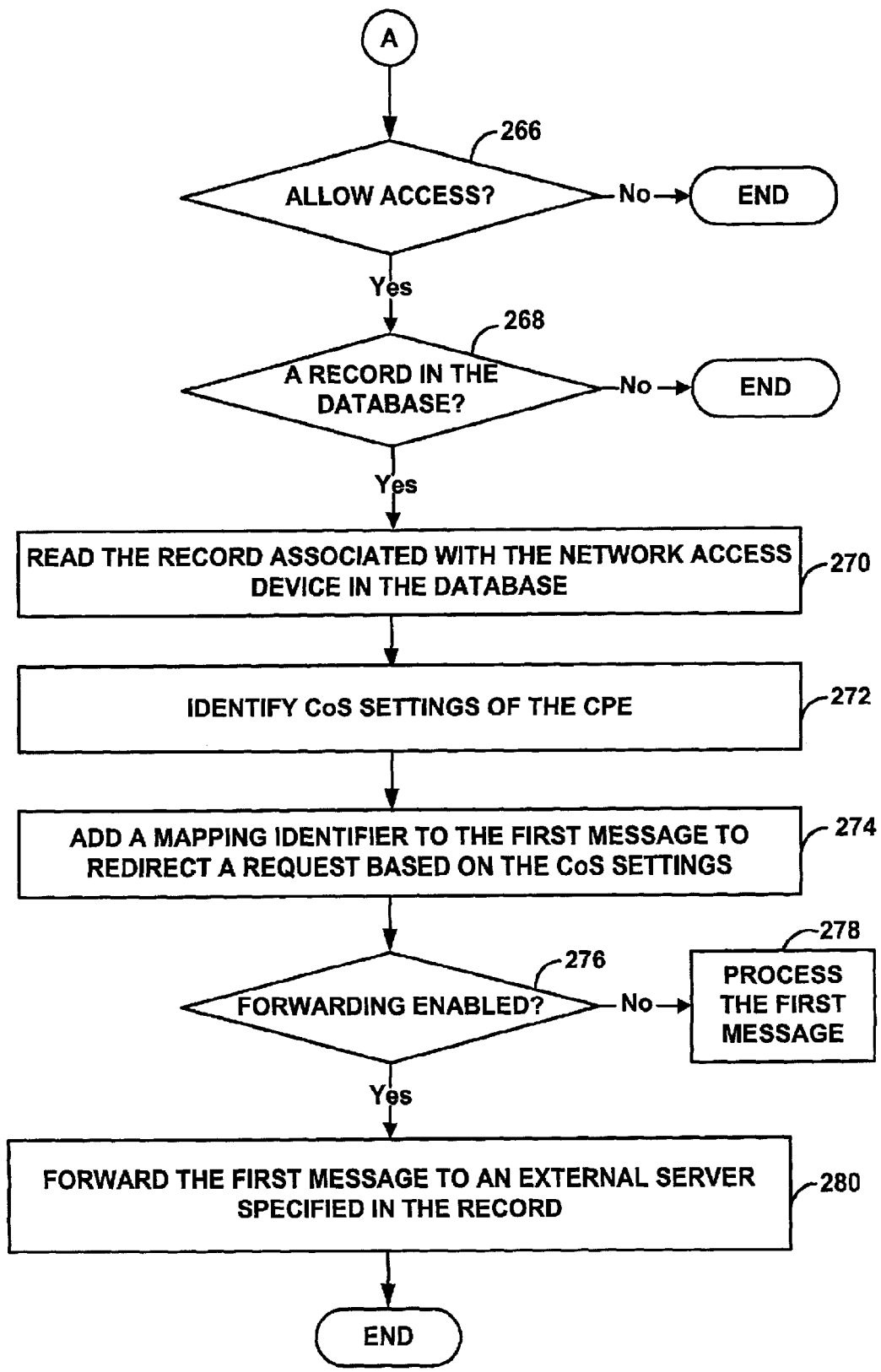

Then, at step 192, the provisioning/access manager 146 determines the identity of a network device associated with the first message. In one embodiment, the provisioning/access manager 146 may determine the identity of the network device by comparing the MAC network address in the "options" field with a MAC network address in the "chaddr" field of the first message. If the MAC network address in the "options" field is the same as the MAC network address in the "chaddr", the the provisioning/access manager 146 concludes that the query came from a cable modem. However, if the MAC network address in the "options" field differs from the network hardware address in the "chaddr" field then, the the provisioning/access manager 146 recognizes that the query came from a CPE. In the exemplary embodiment associated with the method 180, the MAC network address in the "options" field is the same as the MAC network address in the "chaddr" field. Thus, the provisioning/access manager 146 concludes that the first message is associated with the cable modem, and in the exemplary embodiment, the first message is associated with the CM 16. If the values in the fields would differ, the third network entity would conclude that the first network device was a CPE, and FIGS. 14A and 14B illustrate such an embodiment.

At step 194, the provisioning/access manager 146 queries a database such as the database 150 to determine if any pre-configured records exist in the database for the CM 16. According to an exemplary embodiment, the provisioning/access manager 146 queries the database 150 using the MAC network address retrieved from the "options" field in the first message. According to an exemplary embodiment, the provisioning/access manager 146 may specify the type of the first network device in the query. Thus, herein, the provisioning/access manager 146 specifies that the first network device is a cable modem.

If a system administrator has enabled the DHCP filtering options while setting up the configuration options parameters, at step 196 in FIG. 13B, the provisioning/access manager 146 determines whether a prefix of the MAC network address of the CM 16 is one of the allowed MAC network address prefixes stored in the database 150. If the prefix of the MAC network address is not found in the database 150, at step 198, the provisioning/access manager 146 does not process the first message, and the method 180 terminates. If the prefix of the MAC network address is one of the allowed MAC address prefixes, at step 200, the provisioningaccess manager 146 determines whether the database 150 includes a configuration information record associated with the MAC network address of the CM 16. If the database 150 does not have a configuration information record for the CM 16, the provisioning/access manager 146 determines whether the system administrator set up any default settings for unknown network devices. If such settings has been set up, the MAC network address of the CM 16 is entered to the database. Further, the provisioning/access manager 146 determines a default service class and a default configuration file ID with a full path to that file on a network server such as a Trivial File Transfer Protocol server. Further, the provisioning/access manager 146 determines a Provider ID of a network server such as a DHCP server that has been assigned to handle the assignment of default settings such as the assignment of default IP addresses to unregistered network devices. In the exemplary embodiment, the DHCP 144 handles the assignment of the default configuration settings. At step 202, the default settings are returned to the CM 16.

Alternatively, a system administrator can enable one of the configuration options such as the "Default DHCP Processing" option or the "Drop packet" option for unregistered network devices. As described in Table 6, if the system administrator enables the "Default DHCP Processing" option, a network server such as the DHCP server 144 performs stock services for all received requests but does not add the MAC network address associated with the requests to the database 150. Further, if the system administrator enables the "Drop packet" option, the requests from the unregistered network devices are simply dropped and are not processed in the data-over-cable system 147.

If the provisioning/access manager 146 has determined at step 200 that the record for the CM 16 exists in the database 150, at step 204, the provisioning/access manager 146 retrieves the record from the database 150. In one embodiment, the provisioning/access manager 146 determines an identifier of a configuration file and an identifier of a service provider such as an identifier of a DHCP server to which the first message should be forwarded. In one embodiment, as shown in Table 2, each configuration file's identifier maps to a configuration file path, and the provisioninglaccess manager 146 inserts that configuration file path to the first message.

At step 206, the provisioning/access manager 146 determines whether the "Service Forwarding" configuration options parameter has been enabled by the system administrator. If the "Service Forwarding" option has been enabled and the configuration record associated with the CM 16 includes an identifier of a service provider to which the first network message should be forwarded, at step 210, the provisioning/access manager 146 forwards the first message to the specified provider. Thus, according to an exemplary embodiment, the network server such as the DHCP server 144 does not attempt further processing of the request in the first message simply forwards the first message to the specified provider. As described in reference to Table 5, each identifier of a service provider maps to an IP address of the service provider. Thus, the provisioning/access manager 146 uses an IP address of the service provider from the record to forward the first message, and the method 180 terminates. However, if the "Service Provisioning" option is disabled, at step 208, the provisioning/access manager 146 uses the pre-provisioned configuration file identifier and configuration file path to process the first message.

The method 180 has been described in reference to network devices shown in FIG. 5. However, it should be understood that the present invention is not limited to these network devices, and more, fewer and equivalent network devices could also be employed to carry out the described method. Further, unless specified to the contrary, the steps of the flow chart may be taken in sequence other than that described, and more or fewer steps could be used.

FIGS. 14A and 14B shows a flow chart illustrating an exemplary method 250 for configuring a first network device such as the CPE 18 in communication a network access device such as the CM 16.

Referring to FIG. 14A, at step 252, the CPE 18 sends a first message in a data-over-cable system such as the data-over-cable system 142 shown in FIG. 5. According to an exemplary embodiment, the first message is a DHCP message such as a DHCPDISCOVER message or a DHCPREQUEST message and, the structure of the first message is as shown in FIG. 4. Further, according to an exemplary embodiment, the first message includes either a request to discover an IP address for the CPE 18 or an actual request for an IP address.

At step 254, a CMTS such as the CMTS 12 determines whether a system administrator has enabled a parameter associated with the QoS policy provisioning method. According to an exemplary embodimnent, the CMTS 12 determines whether the "agentinfooption" has been set by the system administrator. If the system administrator has not enabled the "agentinfooption" parameter, at step 256, the method 250 terminates, and the request in the first message is processed according to a standard DHCP method. However, if the system administrator has enabled the "agentifooption", the first message is processed according to the exemplary embodiment.

In one embodiment, a vendor option field is added to the CMTS 12 such that when the "agentinfooption" is enabled, an identifier of a network access device such as a MAC network address of a network access device such as the MAC network address of the CM 16 is added to any DHCP request. Thus, at step 258, the second network device modifies the first message by marking the first message with the identifier of the CM 16. In a preferred embodiment, the CMTS 12 maps a MAC network address of the CM 16 in the "options" field 120 of the first message and forwards the message. Further, the CMTS 12 places in the first message an IP address of the relay agent (the "cpegiaddr" set in the CMTS).

At step 260, a third network entity such as the provisioning access manager 146 intercepts the first message. According to an exemplary embodiment, the provisioning access manager 146 intercepts DHCP messages prior to any DHCP network server receives the messages. Thus, the provisioning access manager 146 intercepts the first message prior to a DHCP server such as the DHCP server 144 receives the first message. In one embodiment, the provisioning access manager 146 includes a plurality of dll extensions that execute a set of instructions upon intercepting of any DHCP message. In such an embodiment, when the provisioning access manager 146 receives the first message, the provisioning access manager 146 calls one or more dll extensions to execute a set of instructions such as instructions to query a database for a record associated with the identifier included in the first message.

At step 262, the provisioning access manager 146 determines the identity of a network device that sent the first message. In one embodiment, the provisioning access manager 146 determines the identity of the network device by comparing the MAC network address in the "options" field of the first message with a MAC network address in the "chaddr" field of the first message. In the exemplary embodiment, the MAC network address in the "options" field is different than the MAC network address in the "chaddr" and, thus, this implies that a CPE in communication with the CM 16 is behind the request.

At step 264, the provisioning access manager 146 queries the database 150 to retrieve a configuration record associated with the MAC network address in the "options" field of the first message. According to an exemplary embodiment, since the request has been identified as originating from the CPE, the implied function of the provisioning access manager 146 is to redirect the first message to a special IP range or scope based upon which network access device the CPE is behind. Further, if the CPE requests the network services for the first time, the provisioning access manager 146 enters the MAC network address from the "chaddr" field into the database 150 and marks it as belonging to the CPE. In one embodiment, this event may be a trigger point for the provisioning/access manager 146 to query the CMTS 12 for a relationship of the CPE with a unique network access device such as the CM 16 in the exemplary embodiment.

If the system administrator has enabled the DHCP filtering options while setting up the configuration options, at step 266 in FIG. 14B, the provisioning access manager 146 determines whether a prefix of the MAC network address of the network access device is one of the allowed MAC network address prefixes stored in the database. If the prefix of the MAC network address is not found in the database, the provisioning access manager 146 does not process the request in the first message, and the method 250 terminates.

If the prefix of the MAC network address is one of the allowed prefixes, the provisioning access manager 146 determines whether the database 150 includes a configuration information record associated with the MAC network address of the network access device. If the database 150 does not include any records associated with the network access device, the method 250 terminates. If the configuration information record for the MAC network address specified in the "options" field exists in the database, at step 270, the provisioning access manager 146 retrieves the configuration record from the database 150.

Based on the retrieved record, at step 272, the provisioning access manager 146 determines what class of service any network device behind the network access device should receive. After the class of service has been determined, the provisioning access manager 146 looks up the service class table, which is keyed by the incoming "giaddr" and service classes. The exemplary set of parameters associated with the service class configuration was shown in Table 4.

At step 274, after the provisioning access manager 146 finds an attribute associated with the class of service for the CPE, the provisioning access manager 146 maps the incoming "giaddr" to a new "giaddr" ("mapped giaddr") that specifies the scope of network addresses providing a desired class of service. The "mapped giaddr" allows the network server such as the DHCP server to assign an IP address for the CPE out of the server's subnet, and a new subnet associated with the "mapped giaddr" provides the desired class of service. Further, the "mapped giaddr" does not necessarily differ from the incoming "giaddr" and, in some embodiments, the "mapped giaddr" is the same as incoming "giaddr". Thus, according to an exemplary embodiment, the subnets may be created with the context of service class or, alternatively, with the context of service provider or any other functionality or accounting based grouping.

At step 276, the provisioning access manager 146 determines whether the "Service Forwarding" configuration option parameter has been enabled by the system administrator. If the "Service Forwarding" configuration parameter has been enabled and, further, the configuration information record associated with the MAC network address of the network access device includes an identifier of the service provider to which the requests should be forwarded then, at step 280, the provisioning access manager 146 forwards the request to the specified service provider. In such an embodiment, the network server such as the DHCP server 144 does not attempt to further process the request in the first message sent from the first network device. However, if the "Service Provisioning" configuration option is disabled, at step 278, the network server such as the DHCP server 144 processes the request in the first message.

The method 250 has been described in reference to network devices shown in FIG. 5. However, it should be understood that the present invention is not limited to these network devices, and more, fewer or different network devices could also be employed to carry out the described embodiment. Further, unless specified to the contrary, the steps of the flow chart may be taken in sequence other than that described, and more or fewer steps could be also be used. Further, the exemplary method is not limited to modifying "giaddr" field, and other fields could also be modified.

Further, according to an exemplary embodiment, once configuration parameters and IP addresses are assigned to a network device, a record is created for such network device, and the record is updated every time a lease of a new address is given out to the network device. For example, in an exemplary embodiment, the database 150 stores such records. Table 7 illustrates an exemplary set of parameters that is created for each network device and stored in the database 150.

TABLE 7

| Field | Type | Description |
|---|---|---|
| IP Address | Int | IP address assigned |
| CmMAC | Binary | MAC address of the CM to which this IP address has been assigned. If this IP address is assigned to a CPE, then this value is the MAC address of the CM associated with the CPE. |
| AssignedMac | Binary | MAC address of an adapter that this IP address was assigned. This value could be the same as the CmMAC value. |
| Type | Int | Identifies the device type that is associated with the IP address. Exemplary values are 1 for a CM and 2 for a CPE. |
| LeaseExp | Int | C time that the lease will expire. |

Figure 15:
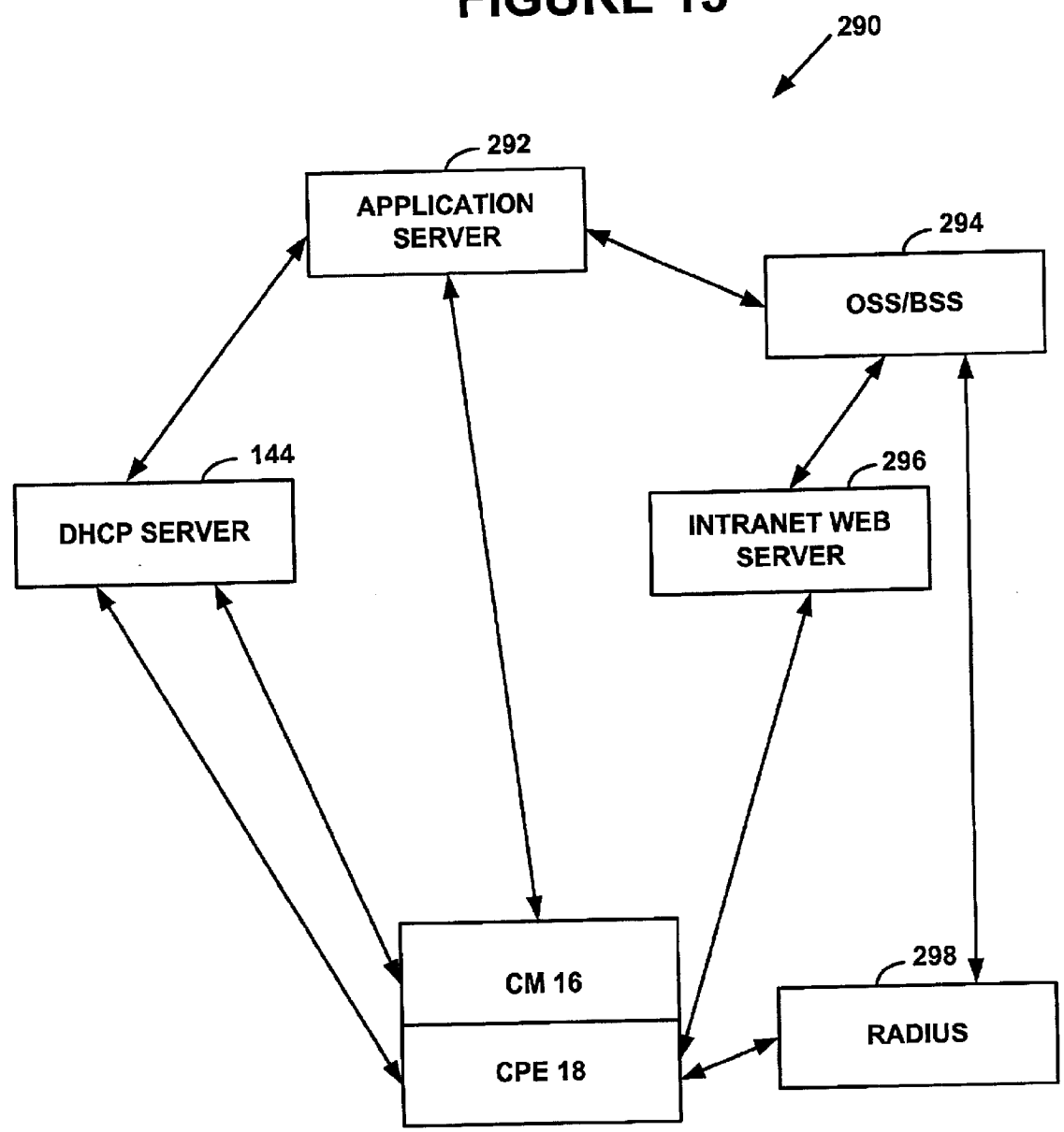
FIG. 15 is a block diagram of a data-over-cable system for an automatic web registration.

Further, according to an exemplary embodiment, a simple automatic web registration and session based prepaid registration are supported in the data-over-cable system 147. FIG. 15 shows an exemplary block diagram of a data-over-cable system 290 for the automatic web registration and session based prepaid registration. The exemplary system 290 is a simplified system and is intended to illustrate a plurality of exemplary network devices employed in the automatic registration and the prepaid registration process. The exemplary system 290 includes the CM 16, the CPE 18, the DHCP server 144, an application server 292, an intranet web server 296, Operations Support System with a Business Support System ("OSS/BSS") 294 and a Remote Authentication Dial-In User Service ("RADIUS") 298. However, the present invention is not limited to these network devices, and more, fewer or equivalent network devices could also be used. As is known in the art, the OSS supports the daily operation of the telecommunication infrastructure, order negotiation, order processing, testing and billing. The BSS is one of the types of the OSS and is typically used by network administrators to manage business operations such as billing, sales management, customer-service management and customer databases. Further, as known in the art, a RADIUS is an authentication accounting client/server based software system that is used by Internet Service Providers ("ISPs") to verify passwords and/or usernames of their clients.

Figure 16B:
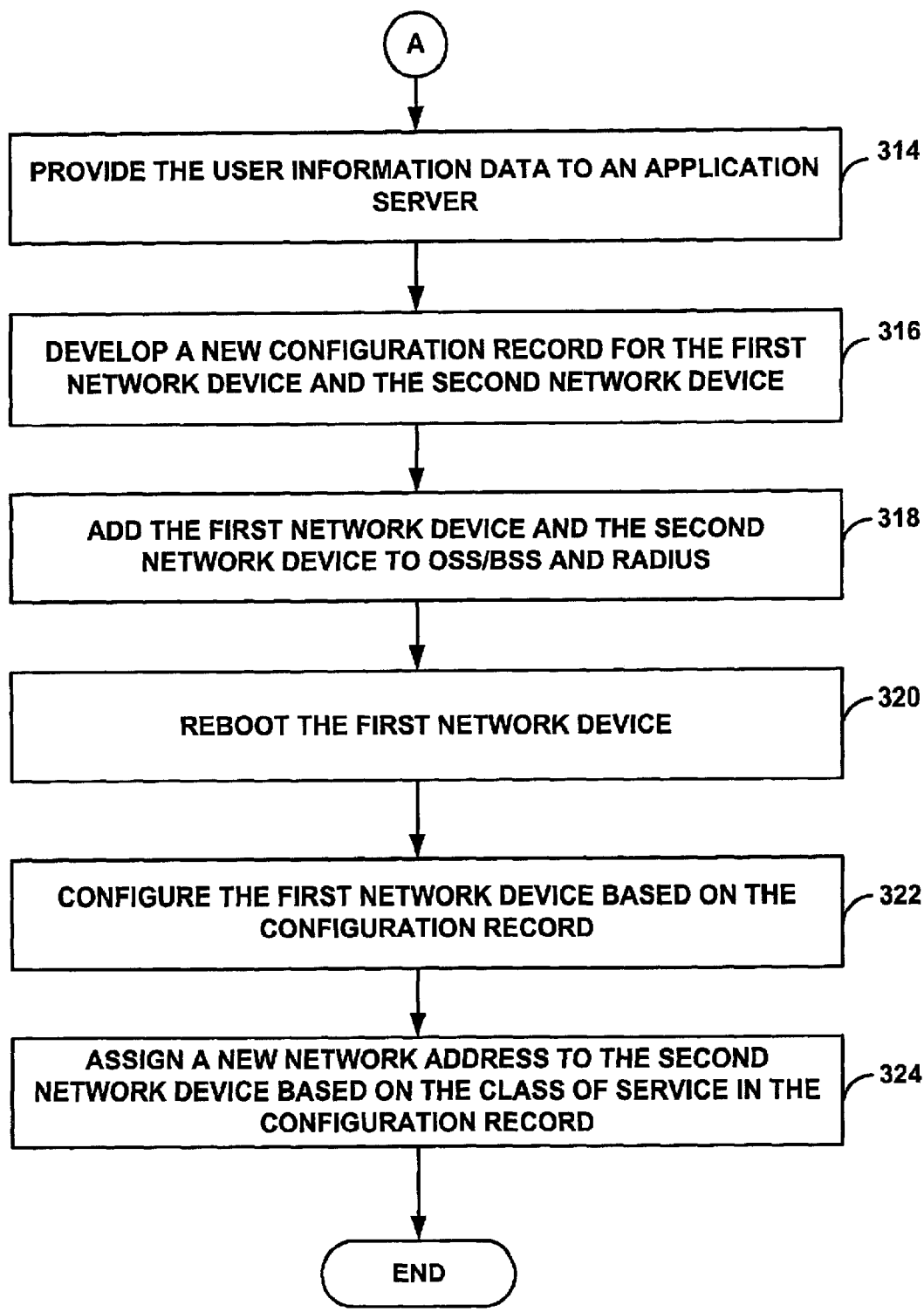

FIGS. 16A and 16B illustrate an exemplary method 300 for automated provisioning and configuring a first network device such as the CM 16 and a second network device such as the CPE 18 associated with the first network device.

Referring to FIG. 13A, at step 302, the first network device boots for the very first time. According to an exemplary embodiment, a third network entity such as the provisioning-access manager 146 queries a database such as the database 150 to determine whether the first network device is one of the registered network devices. Thus, the third network entity determines whether any configuration records exist for a network hardware address of the first network device. However, since the first network device is unknown to the system, no records exist for the first network device. In one embodiment, the third network entity creates a default record for the MAC network address of the first network entity. Next, at step 304, the third network entity assigns a default configuration parameter set to the first network device, and a default configuration file is delivered to the first network device.

At step 306, the second network device associated with the first network device boots for the first time and requests network services. According to the exemplary embodiment, by this time, the first network device is already configured with the default configuration parameters and the default record exists in the database for the first network device. Thus, when the second network device associated with the first network device requests the configuration parameters, the third network entity retrieves the record of the first network device from the database and, at step 308, assigns an intranet IP network address to the second network device. Thus, the second network device receives a non-routable IP address and is given an intranet access.

Then, according to an exemplary embodiment, at step 310, a customer is automatically redirected to an Intranet web server such as the Intranet web server 296. At step 312, the customer is queried to enter a desired CoS, billing information and account information, and the customer signs-up for the service. For example, during the sign-up process, the customer is queried to enter a password or a userid that the customer wants to use. To verify whether the selected userid or the password is available, the Intranet web server 296 communicates with the OSS/BSS 294.

At step 314 in FIG. 16B, the Intranet web server 296 communicates with an application server such as the application server 292. In one embodiment, the server 296 provides sign-up information data of the second network device to the application server 292. To create any records for the second network device, the application server 292 determines what network access device is associated with the first network device. To do that, the application server 292 queries a first protocol server such as the DHCP server 144 for a MAC network address of the network access device, which in the exemplary embodiment is the MAC network address of the CM 16. After the MAC network address is obtained, at step 316, a new configuration record is created for the network access device associated with the MAC network address, and the configuration record is stored in the database 150. According to an exemplary embodiment, the new configuration record includes a plurality of parameters such as a configuration file name for the network access device with a path to the configuration file on a designated server, and a service class identifier for network devices attached to the network access device. Further, a record is created to identify what service class the customer should receive. It is possible that the customer signed up for a prepaid service plan, in which a MAC network address of a customer's network access device is marked as such. Further, if a customer signed up for a monthly service plan, any network devices attached to such customer's network access device will be given a new class of service.

At step 318, the application server 292 adds the user's information data to a pool of users' database on the OSS/BSS 294. Further, the OSS/BSS 294 adds the user's information data to a database of an authentication network device such as a database of the RADIUS 298. At step 320, the application server 292 directs the first network device to re-boot. In one embodiment, the application server 292 employs a Simple Network Management Protocol ("SNMP") to instruct the first network device to re-boot. When the first network device re-boots, at step 322, the first network device configures its internal parameters using a new configuration file. According to an exemplary embodiment, the first network device sends a DHCP message, and the first network device is assigned the new configuration file according to the process described in reference to FIG. 13A and 13B. Upon a completion of the process, the first network device is configured with a plurality of configuration parameters corresponding to a class of service associated with the first network device.

At step 324, when a lease of the temporary intranet IP address of the second network device expires, the second network device is assigned a new IP address based on the class of service in the configuration records stored in the database 150. The process of assigning an IP address to a network device such as the second network device has been described in reference to FIGS. 14A and 14B.

The method 300 has been described in reference to network devices shown in FIG. 15. However, the exemplary method is not limited to these network devices and fewer, more or equivalent network devices could be employed to carry out the described embodiment. Further, the steps of the flow chart may be taken in sequence other than that described, and more or fewer steps could also be used.

There is a plurality of functions that may be used by external network devices to access the database 150 and to perform a number of functional operations. According to one embodiment, a "GetVersion" function, "SetCmInfo" function, "GetCmInfo" function, "DeleteCm" function, "DumpCmInfoToFile" function, "GetCmInfoFromFile" function, "GetIpForCmMac" function, "GetCmMacFromIp" function, "GetNbrOfLic" function and "GetLastError" function are created to allow external systems the interaction with the DHCP server 144. The "GetVersion" returns a version of a currently used API as a whole number. An exemplary function declaration of the "GetVersion" function is: GetVersion( ) as integer.

The "SetCmInfo" function is used to create a new entry in the database 150 if a CM MAC address does not exist in the database 150. An exemplary declaration of the "SetCMInfo" function is: SetCMInfo (CmMacAddr [in] as string, BootFileID as integer, PCServiceClass [in] as integer, ProviderID as integer, Flags as integer) as Boolean. An exemplary code sequence that may be used to create the "SetCmInfo" function is shown in Table 8. However, the exemplary embodiment is not limited to the shown code sequence, and other code sequences could also be used.

TABLE 8

```
Private Sub bnSetCmInfo_Click( )
Dim obj As Object
Dim ErrorCode As Variant, ErrorDesc As Variant
Set obj = CreateObject("DOCSIS.AdminMain")
Dim rc As Integer
rc = obj.SetCmInfo(edSetMac.Text, edSetBootID.Text,
edSetClass.Text,
edProviderIDIn.Text, edFlagsIn.Text)
If rc = 0 Then
obj.GetLastError ErrorCode, ErrorDesc
MsgBox "Error Code:" & ErrorCode & "Error Desc:" &
ErrorDesc
Else
MsgBox "Success"
End If
End Sub
```

The "GetCmInfo" function retrieves information about a given CM. An exemplary declaration of the "GetCmInfo" function is: GetCmInfo (CmMacAddr [in] as string, BootFileID [out] as variant, PCServiceClass [out] as variant, ProviderID[out] as variant, Flags[out] as variant) as Boolean. An exemplary code sequence that may be used to create the "GetCmInfo" is shown in Table 9. However, the exemplary embodiment is not limited to the shown code sequence, and other code sequences could also be used.

TABLE 9

```
Private Sub bnGetCmInfo_Click( )
  Dim obj As Object
  Set obj = CreateObject("DOCSIS.AdminMain")
  Dim rc As Integer
  Dim lBootID As Variant, lClass As Variant, ProviderID As
  Variant, Flags As
  Variant
  Dim CmSettings As Variant
  rc = obj.GetCmInfo(edGetMac.Text, lBootID, lClass,
  ProviderID, Flags,
  CmSettings)
  edGetBootID.Text = lBootID
  edGetClass.Text = lClass
  edProviderID.Text = ProviderID
  edFlags.Text = Flags
  edSettings.Text = CmSettings
  MsgBox ("Returned" & rc)
End Sub
```

The "DeleteCm" function removes a record associated with the specified cable modem from the system. An exemplary function declaration is: DeleteCm (CmMacAddr [in] as string) as Boolean. An exemplary code sequence for creating the "DeleteCm" function is shown in Table 10. However, the exemplary embodiment is not limited to the shown code sequence, and other code sequences could also be used.

TABLE 10

```
Private Sub bnDelCm_Click( )
  Dim obj As Object
  Set obj = CreateObject("DOCSIS.AdminMain")
  Dim rc As Integer
  rc = obj.DeleteCm(edDelCmMac.Text)
  MsgBox ("Returned" & rc)2
End Sub
```

The "DumpCmInfoToFile" function dumps the entire contents of the CmConfig table to a comma-delimited file. The FullFilePath can be either a local path such as "c:\temp\somefile.txt" or a UNC name such as "\\someserver\someshare\somefile.txt". An exemplary function declaration of the "DumpCmInfoToFile" function is: DumpCmInfoToFile (FullFilePath [in] as string) as Boolean. Table 11 shows an exemplary code sequence for creating the "DumpCmInfoToFile" declaration. However, the exemplary embodiment is not limited to the shown code sequence, and other code sequences could also be used.

TABLE 11

```
Private Sub bnDump_Click( )
  Dim obj As Object
  Set obj = CreateObject("DOCSIS.AdminMain")
  Dim rc As Integer
  rc = obj.DumpCmInfoToFile(edDumpFilePath.Text)
  MsgBox ("Returned" & rc)
End Sub
```

The "GctCmInfoFromFile" function retrieves CM configuration information from the specified file. The text file could have the same format as the text file in the "DumpCmInfoToFile". If the MAC address already exists, the other fields will be set to the values in the file. An exemplary function declaration of the "GetCmInfoFromFile" is: "Bool GetCmInfofromFile (FullFilePath [in] as string) as Boolean. Table 12 shows an exemplary code sequence for creating the "GetCmInfoFromFile" declaration. However, the exemplary embodiment is not limited to the shown code sequence, and other code sequences could also be used.

TABLE 12

```
Private Sub bnGetFileInfo_Click( )
  Dim obj As Object
  Set obj = CreateObject("DOCSIS.AdminMain")
  Dim rc As Integer
  rc = obj.GetCmInfoFromFile(edGetFilePath.Text)
  MsgBox ("Returned" & rc)
End Sub
```

The "GetIpForCnMac" function gets an IP address for the specified MAC address. An exemplary function declaration for the "GetIpForCmMac" function is: Bool GetIpForCmMac (CmMac as string, IpAddress[out] as variant). Table 13 shows an exemplary code sequence for creating the "GetIpForCmMac" function. However, the exemplary embodiment is not limited to the shown code sequence, and other code sequences could also be used.

TABLE 13

```
Private Sub bnIpmapping_Click( )
  Dim obj As Object
  Set obj = CreateObject("DOCSIS.AdminMain")
  Dim rc As Integer
  If Option1.Value = True Then 'GetCmMacFromIp
    rc = obj.GetCmMacFromIp(edIpAddr.Text, vntTmp)
    edCmMacIp.Text = vntTmp
  End If
  If Option2.Value = True Then 'GetAssignedMacFromIp
    rc = obj.GetAssignedMacFromIp(edIpAddr.Text, vntTmp)
    edCmMacIp.Text = vntTmp
  End If
  If Option3.Value = True Then 'GetIpForCmMac
    rc = obj.GetIpForCmMac(edCmMacIp.Text, vntTmp)
    edIpAddr.Text = vntTmp
  End If
  MsgBox ("Returned" & rc)
End Sub
```

The "GetCmMacFromIp" function gets the CM MAC address for the specified IP address. According to an exemplary embodiment, the IP address could be a CM's IP address or an IP address of a PC attached to the CM. An exemplary function declaration for the "GetCmMacFromIp" function is: Bool GetCmMacFromIp (IpAddress as string, CmMAC[out] as string). Table 14 shows an exemplary code sequence for creating the "GetCmMacFromIp" function. However, the exemplary embodiment is not limited to the shown code sequence, and other code sequences could also be used.

TABLE 14

```
Private Sub bnIpmapping_Click( )
  Dim obj As Object
  Set obj = CreateObject("DOCSIS.AdminMain")
  Dim rc As Integer
  If Option1.Value = True Then 'GetCmMacFromIp
    rc = obj.GetCmMacFromIp(edIpAddr.Text, vntTmp)
    edCmMacIp.Text = vntTmp
  End If
  If Option2.Value = True Then 'GetAssignedMacFromIp
    rc = obj.GetAssignedMacFromIp(edIpAddr.Text, vntTmp)
    edCmMacIp.Text = vntTmp
  End If
  If Option3.Value = True Then 'GetIpForCmMac
    rc = obj.GetIpForCmMac(edCmMacIp.Text, vntTmp)
    edIpAddr.Text = vntTmp
  End If
  MsgBox ("Returned" & rc)
End Sub
```

The "GetAssignedMacFromIp" function gets a MAC address of a CM or a MAC address of a CPE for an IP address passed in. An exemplary function declaration for the "GetAssignedMacFromIp" function is: Bool GetAssignedMacFromIp(IpAddress as string, MAC[out] as variant). Table 15 shows an exemplary code sequence for creating the "GetAssignedMacFromIp" function. However, the exemplary embodiment is not limited to the shown code sequence, and other code sequences could also be used.

TABLE 15

```
Private Sub bnIpmapping_Click( )
Dim obj As Object
Set obj = CreateObject("DOCSIS.AdminMain")
Dim rc As Integer
If Option1.Value = True Then 'GetCmMacFromIp
rc = obj.GetCmMacFromIp(edIpAddr.Text, vntTmp)
edCmMacIp.Text = vntTmp
End If
If Option2.Value = True Then 'GetAssignedMacFromIp
rc = obj.GetAssignedMacFromIp(edIpAddr.Text, vntTmp)
edCmMacIp.Text = vntTmp
End If
If Option3.Value = True Then 'GetIpForCmMac
rc = obj.GetIpForCmMac(edCmMacIp.Text, vntTmp)
edIpAddr.Text = vntTmp
End If
MsgBox ("Returned" & rc)
End Sub
```

The "GetNbrOfLic" function gets a maximum number of licenses that may be configured in the data-over-cable system 142. An exemplary function declaration of the "GetNbrOfLic" function is: Bool GetNbrOfLic(MaxLics[out] as variant). Table 16 shows an exemplary code sequence for creating the declaration of the "GetNbrOfLic" function. However, the exemplary embodiment is not limited to the shown code sequence, and other code sequences could also be used.

TABLE 16

```
Private Sub bnGetLic_Click( )
Dim obj As Object
Dim rc As Integer
Dim Lics
Set obj = CreateObject("DOCSIS.AdminMain")
rc = obj.GetNbrOfLic(Lics)
If rc <> 0 Then
MsgBox "You have a" & Lics & "CM entry license"
Else
MsgBox "An error has occurred."
End If
End Sub
```

The "GetLastError" function gets the error code and description for the last error to occur for an object instance. An exemplary function declaration for the "GetLastError" function is: Bool GetLastError(ErrorCode[out] variant, ErrorDesc[out] variant), where the "ErrorCode" identifies a number that uniquely identifies the error that occurred and the "ErrorDesc" includes a string description of the error that has occurred. Table 17 shows an exemplary code sequence for creating the "GetLastError" function. However, the exemplary embodiment is not limited to the shown code sequence, and other code sequences could also be used.

TABLE 17

```
Private Sub bnGetLastError_Click( )
Dim obj As Object
Dim rc As Integer
```

TABLE 17-continued

```
Dim ErrorCode As Variant
Dim ErrorDesc As Variant
Set obj = CreateObject("DOCSIS.AdminMain")
rc = obj.GetLastError(ErrorCode, ErrorDesc)
If rc <> 0 Then
MsgBox "Error Code:" & ErrorCode & "Error Desc:" & ErrorDesc
Else
MsgBox "Get Last Error Failed."
End If
End Sub
```

Automatic Boot Server Load Balancing

According to a preferred embodiment, the provisioning/access manager 146 comprises a "Rules Builder" that provides means for defining when and why an action is taken. In one embodiment, the rules from the "Rules Builder" are executed prior to providing network services to network devices in an exemplary data-over-cable system. For example, a set of rules may be executed prior to a boot file assignment or an IP address assignment. In one embodiment, a system administrator may create a set of conditions associated with each rule via the GUI tool 140. Further, the system administrator provisions and manages the rule assignment and creation of a plurality of conditions associated with each rule via a dialog box such as the one shown in FIG. 6 illustrating the administration tools. In one embodiments the system administrator simply selects the graphical selection input "Rules Builder" to invoke an interface for setting up rule definitions. FIG. 17 illustrates an exemplary dialog box that the system administrator uses for creating rules and adding or deleting conditions associated with each rule. In particular, FIG. 17 illustrates a "Load Balance 1" rule with a set of conditions associated with the "Load Balance 1" rule.

According to an exemplary embodiment, the "Rules Builder" is used to define a number of predefined conditions, and when all conditions in a specific rule are valid, then, other parts of the system can take actions based on the predefined conditions. In one embodiment, a single rule comprises a plurality of conditions that all must be true for the rule to be a valid condition. In one embodiment, if a rule includes a valid condition, the rule maps to a profile identifier associated with the rule. Further, the profile identifier may be associated with a functional operation or a set of sub-profiles that map to a predetermined set of parameters.

According to an exemplary embodiment, the provisioning/access manager 146 administers load balancing. In one embodiment, the provisioning/access manager 146 manages and stores in the database 150 a plurality of parameters associated with CMTSs in data-over-cable networks. The storing of these parameters allows the provisioning/access manager 146 to malke better decisions concerning boot file assignment, forwarding of requests to network devices and CMTS load balancing. According to an exemplary embodiment, the parameters associated with the CMTSs include definitions of CMTS service areas, individual CMTS settings and cable pair settings.

According to an exemplary embodiment, a CMTS service area defines a set of compatible channel pairs that are arranged to service the same set of CMs on the network. According to an exemplary embodiment, the channel pairs are compatible when any CM that comes up on one of them could also come up on any of the channel pairs in a given service area. Further, a service area could be composed of many physical CMTSs, and many service areas could be located on the same CMTS. Further, the service areas are not restricted to a specific CMTS, and the service areas can overlap. For example, if a CMTS 1 has channel pairs 1, 2, 3, 4 and a CMTS 2 has channel pairs A, B, C, D then, any combination of channel pairs may establish a service area. For example, a service area 1 could include channel pairs 1, A and B, a service area 2 could include channel pairs C and D, and a service area 3 could include channel pairs 3, 4 and B. However, it should be understood that service areas do not correlate with IP subnets since the IP subnets directly relate to a predetermined CMTS, and a service area could span multiple CMTSs. Thus, for example, if a CMTS 1 supports a class C subnet of 192.1.10.0 then, no other CMTS can handle direct CM traffic for the 192.1. 10.0 subnet.

A channel pair is unique for a service area and a CMTS and, therefore, the same value of the channel pair can be used in a different service area. Further, according to an exemplary embodiment, each CMTS is defined by its internal settings such as subnets that are supported on a CMTS, channel pairs associated with the CMTS or passwords, for example.

According to an exemplary embodiment, the "Rues Builder" defines a set of rules that are applied to capabilities and settings of an incoming CM and, if a rule is true, the CM is assigned to a specified type of channel pair. Further, the "Rules Builder" includes rules that are is set in such a manner so that some rules can take precedence over each other. In one embodiment, a more complicated rule is processed prior to a less complicated rule is processed. Once a rule is evaluated to being true then, a predetermined set of actions is triggered. However, if none of the rules are true, a default policy is triggered.

In one embodiment, load-balancing policies could be applied to move certain versions of CMs, or CMs with certain capabilities, to specific channel pairs or CMTSs. Since the channel pairs belong to CMTSs, it is possible to effectively load balance CMs between different CMTSs. In one embodiment, for example, a set of rules could be created to re-route all DOCSIS 1.1 CMs to a predetermined CMTS, a group of predetermined CMTSs or specific downstream channel pairs. Similarly, the same type of rule could be created for DOCSIS 1.0 modems. Further, a set of modem assignment rules could be created to assign CMs to downstream channels or CMTSs based on segregating types of CPEs to predetermined CMTSs that support them. For example, all telephony CMs could be pre-segregated to a predetermined group of CMTSs, and all host-based CMs could be pre-segregated to a different predetermined group of CMTSs. As mentioned in the proceeding paragraphs, the assignment could also be based on the channel pairs.

Table 18 illustrates a set of parameters that could be set up in a data-over-able system with a load balancing policy according to an exemplary embodiment. Table 18 illustrates an exemplary set of parameters associated with a partial network set up, where the partial network contains only one service area with two CMTSs, and each CMTS supports three channel pairs.

TABLE 18

| CMTS Service Area | CMTS | Channel Pair | Pair Type | Load Factor | Max CMs |
| --- | --- | --- | --- | --- | --- |
| SA1 | CMTS1 | CP1 | MTA only | 100% | 1000 |
| SA1 | CMTS1 | CP2 | MTA only | 50% | 1000 |
| SA1 | CMTS1 | CP3 | Frag Supported MTA only | 75% | 750 |

TABLE 18-continued

| CMTS Service Area | CMTS | Channel Pair | Pair Type | Load Factor | Max CMs |
| --- | --- | --- | --- | --- | --- |
| SA1 | CMTS2 | CP4 | V1.0 preferred | 100% | 3000 |
| SA1 | CMTS2 | CP5 | Frag Supported V1.0 preferred | 75% | 2000 |
| SA1 | CMTS2 | CP6 | V1.1 other | 100% | 2000 |

In the exemplary Table 18, the "Pair Type" category is an administrator-defined category and is similar to a service class. The "Pair Type" category allows for channel pairs to be grouped by some kind of designation. According to an exemplary embodiment, a channel pair can belong to many different pair types, and a channel pair is not limited to be associated with only one pair type. For example, the channel pair CP3 is associated with the pair type that supports fragmentation and MTAs. However, the channel pair definition and assignment in Table 18 illustrate only an exemplary set of parameters, and different pair type definitions could also be used. Further, in the exemplary embodiment, the "Load Factor" category defines a percentage of total capacity for the specified channel pair that is available for use in the network, and the "MaxCMs" category defines a capacity setting of the channel pair. For example, if a channel pair had a "Load Factor" of 50% and "MaxCMs" of 1000 then, provisioning/access manager 146 would only assign a total number of 500 CMs to this channel pair. Also, with such an exemplary setting, the provisioning/access manager 146 would assign CMs to this channel pair half as often as for a channel pair with a "Load Factor" of 100%. For example, 2 out of 3 requests could be directed to the channel pair with the 100% "Load Factor" to allow for a smoother distribution of CM requests.

According to an exemplary embodiment, a set of global load balancing policy rules is created on the provisioning/access manager 146. Table 19 illustrates an exemplary set of global load balancing policy rules.

TABLE 19

| RULE | ACTION |
| --- | --- |
| (RULE A) MTA Device = True | Assign to pair type "MTA only" |
| (RULE B) V1.1 = True and Fragmentation Support = True | Assign to the pair type "Fragmentation Supported" |
| (RULE C) V1.0 True and Fragmentation Support = True | Assign to the pair type "Fragmentation Supported" |
| (RULE D) V1.0 = True | Assign to the pair type "V1.0 preferred" |
| DEFAULT | Assign to the pair type "V1.1 other" |

However, the set of rules shown in Table 19 should not be read as limiting, and fewer, more or equivalent set of rules could also be created. For example, a set of rules could be created based on a type of network device associated with the request. In one embodiment, the network device associated with the request could be any type of CPE device such as a network appliance device, a VoIP device or any other type of device. In another embodiment, a set of policies could be created to allow only a predetermined number of requests from one type of CPE device to be forwarded to any given server address. Further, according to an exemplary embodiment, the provisioning/access manager 146 may monitor and manage traffic engineering based on a number of requests over time. For example, a set of rules could be created to allow no more that a predetermined number of requests to any given server address over a predetermined number of seconds.

According to an exemplary embodiment, the provisioning/access manager 146 may execute the exemplary set of global load-balancing policy rules upon a receipt of any DHCP message from a network device such as the CM 16 or the CPE 18. For example, as shown in Table 19, the provisioning/access manager 146 determines whether a network device is a DOCSIS 1.0 compliant network device (V1.0 in Table 19) or DOCSIS 1.1 compliant network device (V1.1 in Table 19) and assigns a predetermined channel pair based on the capability of the network device. For example, the provisioning/access manager 146 may determine whether the network device is DOCSIS 1.0 or DOCSIS 1.1 compliant network device based on information in a DHCP message sent from the network device. In an exemplary embodiment, every DHCP message includes an option code 60 that is a Vendor Class Identifier, and the option code 60 includes information that allows the third network device to differentiate between DOCSIS 1.1 and DOCSIS 1.0 requests. However, the exemplary embodiment is not limited to DOCSIS compliant network devices, and it could be applied with any other currently existing or later developed standards.

Typically, the option code 60 also includes encoded ASCII values defining whether a Media Terminal Adapter ("MTA") is employed in a system. As known in the art, a typical MTA includes an interface to a physical voice device, a network interface, signaling means and encapsulation means required for VoIP transportation, class feature signaling and QoS signaling. Thus, in the exemplary embodiment, when the third network device receives a DHCP message, the third network device may determine the version of the network device associated with the DHCP message. Further, using the option code 60, the third network device may determine whether an MTA device is used with a network device associated with a DHCP message.

FIG. 18 is a flow chart illustrating a method 400 for load balancing in an exemplary data-over-cable system according to an exemplary embodiment.

Referring to FIG. 18, at step 402, a second network device marks a first message from a first network device with an identifier of a network access device. According to an exemplary embodiment, the first network device includes the network access device, thus, the second network device marks the first message with the identifier of the first network device.

At step 404, a third network device intercepts the first message prior to any first protocol server receiving the first message. Further, the third network device may determine whether the first network device is a registered network device. According to an exemplary embodiment, to determine whether the first network device is a registered network device, the third network device determines whether any configuration information record exists in a database for the first network device. In one embodiment, the configuration information records in the database are set up based on identifiers of network access devices. Thus, the third network device uses the identifier in the first message to verify whether the first network device is a registered network device.

According to an exemplary embodiment, a load balancing policy can be disabled or enabled in the exemplary data-over-cable system. At step 406, the third network device determines whether the load balancing policy has been enabled and, further, whether any rules has been set up for the load balancing policy. If the load balancing policy is not enabled, at step 408, the third network device assigns default parameters for the first network device. In one embodiment, if the first network device is a registered network device, the third network device assigns a set of parameters defined in the configuration information record of the first network device. In an exemplary embodiment, each record in the database 150 is established using identifiers of network access devices. Thus, the third network device retrieves the configuration information record from the database 150 using the identifier from the first message. However, if the first network device is not a registered network device, the third network device may process the first message using default configuration parameters associated with unknown network devices.

If the load balancing has been enabled in the exemplary data-over-cable system, at step 410, the third network device determines capabilities of the network access device associated with the first network device using the information in the first message and any information from the configuration information record. In the exemplary embodiment, the first network device comprises the network access device and, thus, the third network device determines capabilities of the first network device. In one embodiment, the third network device uses the first message to determine the capabilities of the first network device. For example, the third network device may determine whether the first network device is a DOCSIS 1.1 or DOCSIS 1.0 compliant network device, or whether the second network is used in a Telco Return data-over-cable system. However, the exemplary embodiment is not limited to determining whether the first network device is the DOCSIS 1.1 or DOCSIS 1.0 compliant network device or whether it is used in the Telco Return system. For example, the third network device could also determine fewer, more, different or equivalent parameters associated with the capability of the second network device such as any fragmentation parameters.

Once the third network device determines the capabilities of the network access device (in the exemplary embodiment, the capability of the first network device), at step 412, the third network device applies a load balancing policy. In one embodiment, the third network device applies the load balancing policy based on the capabilities of the first network device, the type of the first network device and, further, based on a set of rules associated with the load balancing policy. In the exemplary embodiment, the database stores the set of rules associated with the load balancing policy as well as the availability and a current use of channel pairs. In addition, if the first network device is a registered network device, the third network device may also use any parameters stored in a configuration information record associated with the first network device to determine the capabilities of the first network device and load-balance the request according to the set of rules. For example, in one embodiment, the configuration information record of the first network device could include forwarding data with an instruction to forward any requests from the first network device to a predetermined server.

At step 414, the third network device determines whether any rule resolves to being a true condition. If none of the rules are true, at step 416, the third network device applies a default rule. In one embodiment, the default rule maps to a predetermined set of parameters associated with the default rule. If one of the rules is true, at step 418, the third network device determines the assignment of network resources and parameters based on the true rule and further based on load factors. In one embodiment, the third network device determines a channel pair that should be assigned to the first network device based on the true rule associated with the capabilities of the first network device and, further, based on available channel pairs and a load factor associated with each channel pair.

At step 420, the third network device assigns a set of parameters to the first network device based on the rule, and further, the third network device records the assignment of parameters. In the exemplary embodiment, the third network device records the assignment of channel pairs to the first network device in order to efficiently load-balance any future requests.

In the exemplary method 400, the first network device is the CM 16, the second network device is the CMTS 12 and the third network device is the provisioning/access manager 146. Further, the first message is a DHCP message and the first protocol server is a DHCP server. Also in the exemplary method 400, the marked identifier in the first message includes a MAC address of the CM 16. However, the exemplary method is not limited to these network devices, and different or equivalent network devices could also be used. Further, unless specified to the contrary, the steps of the flow chart may be taken in sequence other than that described, and more or fewer steps could be used.

According to an exemplary embodiment, the provisioning/access manager 146 handles DHCP requests in accordance with a set of rules associated with the load balancing policy, according to an exemplary embodiment. Table 20 illustrates an exemplary set of requests from CMs, and an exemplary channel assignment based on capabilities of each CM. The channels in Table 20 correspond to a set of channels shown in Table 18 and a channel assignment is based on the set of global load balancing policy rules shown in Table 19.

TABLE 20

| CM | CM Capabilities | Assigned Channel |
|---|---|---|
| CM 1 | MTA Device | CP1 |
| CM 2 | MTA Device | CP 3 |
| CM 3 | MTA Device | CP 1 |
| CM 4 | MTA Device | CP 2 |
| CM 5 | V1.0 Telco Return | CP 4 |
| CM 6 | V1.0 2WayCm | CP 5 |
| CM 7 | V1.0 Fragmentation enabled | CP 3 |
| CM 8 | V1.1, No Fragmentation | CP 6 |
| CM 9 | V1.1 Telco Return, No Fragmentation | CP 6 |

In the exemplary Table 20, the requests of MTA capable network devices are most likely to be assigned to the channel pair 1 since, as shown in Table 8, the load factor of the channel pair 1 is 100%. Further, because the channel pair 3 has the load factor of 75%, the provisioning/access server 146 assigns the channel pair 3 prior to an assignment of any requests to the channel pair 2 since the channel pair 2 has the load factor of 50%. Further, since the load factor of the channel pair 1 is twice as high as the load factor of the channel pair 2, the channel pair 3 receives half as many CM assignments as the channel pair 1. Further, for example, since the CM 6 is defined as a V1.0 device and has the fragmentation enabled, the provisioning/access manager 146 assigns the CM 6 to the CP 5 since the exemplary load balancing policy (Rule C) states that the CM V1.0 having the fragmentation enabled should be assigned to a channel pair defined as the "Frag Supported". According to an exemplary embodiment, if a CM has capabilities that are not specified by the load balancing policy, and a CM is a CM version 1.1, then such a CM meets the conditions of the "Default" rule defined in Table 19. Thus, the CM 8 and the CM 9 are assigned to the CP 6.

Further, according to an exemplary embodiment, the provisioning/access manager 146 redistributes DHCP messages with TFTP requests between a plurality of TFTP servers. The redistribution of TFTP requests between a number of different TFTP servers is especially useful after the power outage when thousands of CMs may re-boot at the same time since a typical TFTP server is only capable to handle around a couple hundred requests per minute. In one embodiment, each CMTS service area has a list of TFTP servers associated with the CMTS service area, and the provisioning/access manager 146 load-balances the TFTP server re-direction across available TFTP servers and, further, keeps the record of all TFTP server re-directions.

Figure 19A:
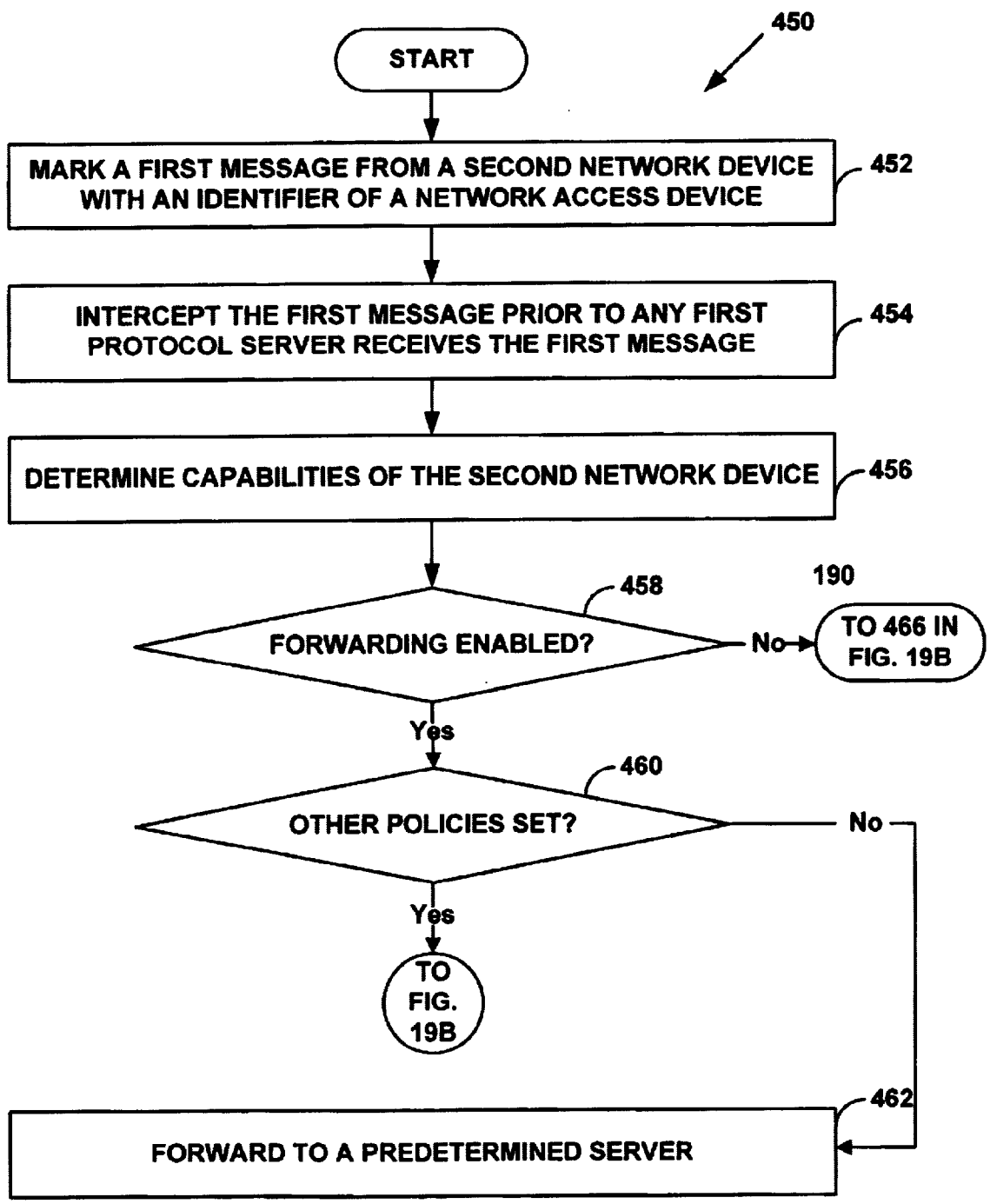
FIGS. 19A and 19B are a flow chart illustrating another exemplary method for load balancing according to an exemplary embodiment.
Figure 19B:
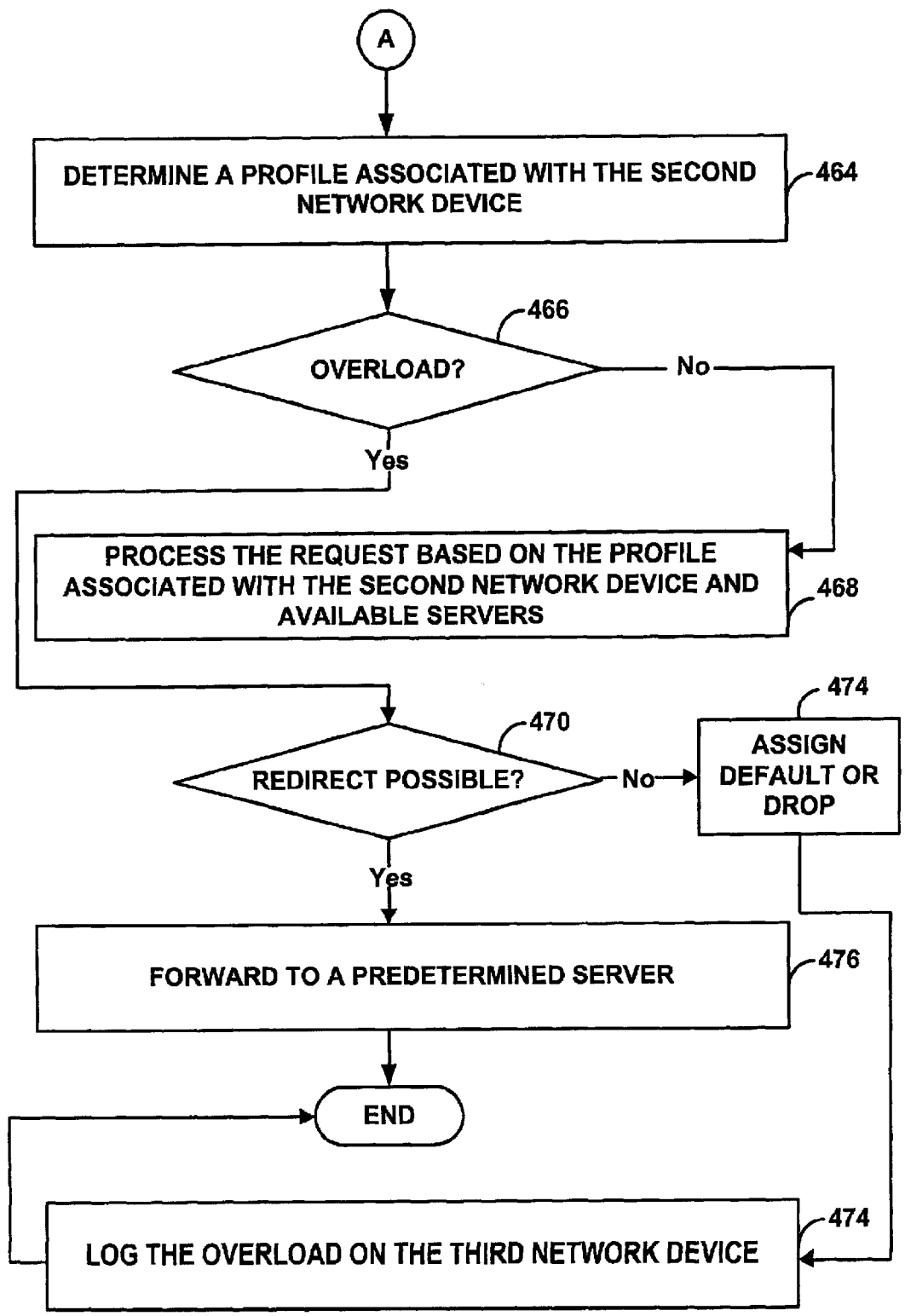

FIG. 19 is a flow chart illustrating an exemplary method 450 for a load balancing of a second protocol server redirections according to an exemplary embodiment.

Referring to FIG. 19, at step 452, a first network device marks a first message from a second network device with an identifier of a network access device. In an exemplary embodiment, the second network device includes the network access device and, thus, the first network device marks the first message with an identifier of the second network device. At step 454, a third network device intercepts the first message prior to any first protocol server receives the first message.

At step 456, the third network device determines capabilities of the second network device using parameters in the first message. In one embodiment, the third network device determines whether the type of the second network device. For example, the third network device determines whether the second network device is DOCSIS 1.0 or DOCSIS 1.1 compliant network device. Further, the third network device may determine the type of a network, in which the second network device operates. For example, the second network device could operate in a data-over-cable system using a telephony return, or the second network device could operate in a two-way data-over-cable network, or any other non-cable network.

In addition to determining the capabilities of the second network device using the parameters in the first message, the third network device uses the identifier marked in the first message to determine whether the second network device is one of the registered network devices. In one embodiment, a database associated with the third network device stores identifiers of all registered network devices, and each identifier of a network device is associated with a configuration information record. Thus, if the second network device is a registered network device, the third network device determines any additional parameters associated with the capabilities of the second network device by retrieving from a database the configuration information record associated with the second network device.

At step 458, the third network device determines whether a forwarding function has been enabled. If forwarding has been enabled, at step 460, the third network device determines if any additional policies have been set. In one embodiment, the policies could include a set of rules, where each rule maps to a predetermined functional operation or a predetermined set of parameters. For example, a set of rules could be defined to assign a predetermined channel pair for the second network based on the capabilities of the second network device and based on load factors associated with each channel pair. If no additional policies have been set, at step 462 the third network device forwards the first message to a predetermined server, where the predetermined server is a first protocol server. In one embodiment, if the second network device is one of the registered network devices and, further, a configuration information record associated with the second network device includes an identifier of a predetermined first protocol server, the third network device may forward the first message to the predetermined first protocol server listed in the record.

If any additional policies have been set, at step 464, the third network device determines a predetermined profile associated with the second network device. In one embodiment, the third network device determines the predetermined profile of the second network device using the parameters associated with the capabilities of the second network device. For example, the predetermined profile parameter associated with the second network device could map to a predetermined service area having a plurality of second protocol servers.

According to an exemplary embodiment, each of the plurality of second protocol servers is capable to handle a predetermined number of requests, and the third network device keeps track of all requests being handled. In one embodiment, each service area could have a threshold parameter defining a maximum number of requests that could be handled by a group of second protocol servers associated with a specific service area In such an embodiment, at step 466, the third network device determines whether an overload has occurred in the service area associated with the second network device. In one embodiment, the third network device determines whether the overload has occurred in the service area using a predetermined threshold value defining a maximum number of request for the service area.

If the overload has not occurred in the service area associated with the second network device, at step 468, the third network device assigns the second network device to the pre-determined service area. Further, the second network device load-balances the request in the first message between the second protocol servers in the predetermined service are However, if the overload has occurred in the service area, at step 470, the third network device determines whether the request in the first message could be re-directed. In one embodiment, if the second network device is a registered network device, the third network device determines whether the configuration information record associated with the second network device specifies any alternative second protocol servers. Alternatively, the third network device could have a list of alternative second protocol servers compliant with each predefined service area. In such an embodiment, the third network device determines if at least one such an alternative second protocol server exists for the service area associated with the second network device. If either the configuration information record of the second network device or the third network device includes a record defining an alternative second protocol server for the second network device, at step 472, the third network device redirects the first message to the predetermined server in the record.

If the redirection is not possible, for example, the third network device determines whether any default service area have been defined for any requests that can not be handled in predetermined service areas. If such a default service area has been defined, and default second protocol servers in the default service area are not overload, at step 474, the third network device load balances the request between the default second protocol servers. In a second embodiment, if the redirection is not possible, the third network device drops the first message and notifies the second network device that the request could not be processed.

Further, at step 476, the third network device records that the overload has occurred in the predetermined service area associated with the second network device. If a default service area has been assigned to the second network device, the third network device records that the default service area has been assigned to handle processing of the first message. In one embodiment, once the overload problem in the predetermined service area associated with the second network device is overcome, the third network device may request the second network device to re-send the first message so that one of the second protocol servers in the service area of the second network device can process the request in the first message.

In the exemplary embodiment, the first network device is the CMTS 12, the second network device is the CM 16 and the third network device is the provisioning/access manager 146. Further, the first protocol servers are DHCP servers, the first message is a DHCP message and the second protocol servers are TFTP servers. Further, the identifier of the second network device includes a MAC address of the second network device. However, the exemplary method described in reference to FIG. 19 is not limited to these network devices and more, fewer or equivalent network devices could also be used. Further, unless specified to the contrary, the steps of the flow chart may be taken in sequence other than that described, and more or fewer steps could be used.

In view of many embodiments to which the principles of the invention may be applied, it should be understood that the illustrated embodiments are exemplary embodiments and should not limit the present invention as defined by the claims. Further, the exemplary embodiments have been described in reference to a data-over-cable network. However, the present invention is not limited to the data-over-cable networks, and it could also be used in networks capable of transmitting data associated with an Asynchronous Transfer Mode protocol, Asymmetric Digital Subscriber Line protocol, Voice over Internet Protocol, Internet Protocol or a protocol associated with cable television data streams. Further, the described methods are not limited to a data-over-cable system, and could also be applied in other types of networks such as an Ethernet network or a network having broadband wireless links, fixed wireless links, DSL links or fiber optic links, for example. Further, unless specified to the contrary, the steps of the flow charts may be taken in sequence other than those described, and more, fewer or equivalent elements or components could also be used.

what is claimed is:

1. A method for dynamic load balancing of requests in a network system, the method comprising the steps of:

receiving a first message on a first network device from a second network device and marking the first message with an identifier of a network access device;

intercepting the first message on a third network device prior to at least one first protocol server receiving the first message, wherein the third network device comprises a set of rules for load balancing of requests between a plurality of channel pairs, each channel pair having predetermined resources for a network device with predetermined capabilities;

determining capabilities of the second network device on the third network device; and applying the set of rules to determine an assignment of the second network device to one of the channel pairs based on the capabilities of the second network device, a load factor associated with the channel pair or a threshold value defining a capacity of the channel pair.

2. The method as claimed in claim 1, wherein the network system comprises a data-over-cable system, a broadband wireless system, a Digital Subscriber Line system, an Integrated Services Digital system or an Asynchronous Transfer Mode system.

3. The method as claimed in claim 1, wherein the first network comprises a cable modem termination system.

4. The method as claimed in claim 1, wherein the network access device comprises a cable modem, and the identifier associated with the network device comprises a Medium Access Control address of the cable modem.

5. The method as claimed in claim 1, wherein the first message comprises a Dynamic Host Configuration Protocol message.

6. The method as claimed in claim 1, wherein the at least one first protocol server comprises at least one Dynamic Host Configuration Protocol server.

7. The method as claimed in claim 1, wherein the third network device comprises a provisioning-access manager network device.

8. The method as claimed in claim 1, wherein each rule comprises at least one condition associated with capabilities of network devices and maps to at least one predetermined channel pair having a predetermined load factor and a predetermined capacity.

9. The method as claimed in claim 8, wherein the at least one condition associated with capabilities of network device defines a predetermined type of network devices.

10. The method as claimed in claim 8, wherein the at least one condition associated with the capabilities of network device defines a predetermined version of network devices.

11. The method as claimed in claim 8, wherein the at least one condition associated with the capabilities of network device defines a predetermined type of customer premises equipment associated with the second network device.

12. The method as claimed in claim 8, wherein the step of applying the set of rules to determine the assignment of the second network device to one of the channel pairs, comprises:

comparing the determined capabilities of the second network device with the at least one condition of each rule; and if at least one rule comprises valid conditions, determining the assignment of the second network device to one of the channel pairs associated with the rule using a load factor of each pair type associated with the rule and further using a capacity of each pair type having the valid conditions.

13. The method as claimed in claim 1, wherein the step of determining the capabilities of the second network device comprises:

examining the first message for parameters associated with the capabilities of the second network device;

using the identifier in the first message to determine whether a configuration information record exists in a database associated with the third network device, wherein the database stores a plurality of configuration information records and each record comprises an identifier of a network access device; and, if the configuration information record associated with the second network device exists in the database;

retrieving the capabilities of the second network device from the configuration information record.

14. The method as claimed in claim 1, further comprising, recording the assignment of the second network device to one of the channel pairs.

15. The method as claimed in claim 1, wherein the threshold value defining the capacity of the channel pair defines the maximum number of requests for the channel pair.

16. The method as claimed in claim 1, further comprising, assigning the second network device to a predetermined service area based on the channel pair assigned to the second network device, wherein the predetermined service area comprises a plurality of channel pairs compatible with the channel pair associated with the second network device and further comprising a plurality of second protocol servers.

17. The method as claimed in claim 16, further comprising load balancing of an assignment of the second network device to one of the plurality of second protocol servers, wherein the plurality of second protocol servers comprises a plurality of Trivial File Transfer Protocol servers.

18. The method as claimed in claim 1, wherein the second network device sends data associated with an Asynchronous Transfer Mode protocol, Asymmetric Digital Subscriber Line protocol, Voice over Internet Protocol, Point to Point Protocol over Ethernet or Internet Protocol.

19. A computer readable medium having stored therein instructions for causing a central processing unit to execute the steps of claim 1.

20. The method as claimed in claim 1, wherein the step applying the set of rules to determine the assignment of the second network device to one of the charnel pairs is based on the capabilities of the second network device, the load factor associated with the channel pair and the threshold value defining the capacity of the channel pair.

21. A network system for load balancing of requests from network devices, the system comprising in combination:

a first network device for marking a first message from a second network device with an identifier of a network access device; and a third network device for load balancing of requests from network devices, the third network device intercepting the first message prior to at least one first protocol server receiving the first message and applying a set of load balancing policy rules to determine an assignment of the second network device to a predetermined channel pair based on capabilities of the second network device, a load factor associated with the channel pair or a threshold value defining a capacity of the channel pair.

22. The system claimed in claim 21, wherein the network system comprises a data-over-cable system, a broadband wireless system, a Digital Subscriber Line system, Integrated Services Digital network or an Asynchronous Transfer Mode system.

23. The system as claimed in claim 21, wherein the first network device comprises a cable modem termination system.

24. The system as claimed in claim 21, wherein the second network device comprises a cable modem and the identifier of the network access device comprises a Medium Access Control address of the cable modem.

25. The system as claimed in claim 21, wherein the third network device comprises a policy access manger network device.

26. The system as claimed in claim 21, wherein the first message comprises a Dynamic Host Configuration Protocol message.

27. The system as claimed in claim 21, wherein the at least one first protocol server comprises a Dynamnic Host Configuration Protocol server.

28. The system as claimed in claim 21, wherein each load balancing policy rule comprises at least one condition defining capabilities of the second network device and maps to at least one predetermined channel pair, each predetermined channel pair having a predetermined load factor and a predetermined capacity.

29. The system as claimed in claim 21, wherein the third network device records the assignment of the channel pair to the second network device.

30. The system as claimed in claim 21, wherein each load balancing rules comprises at least one condition defining capabilities of network devices and, if a rule comprises valid conditions, the third network device assigning the second network device to a predetermined group of channel pairs, and based on load factors and capacity of channel pairs in the predetermined group, the third network device assigning the second network device to one channel pair from the predetermined group of channel pairs.

31. The system as claimed in claim 21, wherein prior to applying the set of load balancing policy rules, the third network device determines capabilities of the second network device using parameters in the first message and further using the identifier to determine whether a configuration information record exists in a database associated with the third network device, and, if the configuration information record exists in the database for the second network device, the third network device retrieving the capabilities of the second network device from the record.

32. The system as claimed in claim 21, wherein the third network device further assigns the second network device to a predetermined service area based on the channel pair assigned to the second network device, the service area comprising a plurality of channel pairs compatible with the channel pair assigned to the second network device.

33. The system as claimed in claim 32, wherein the service area comprises a plurality of second protocol servers, and the third network device load balances an assignment of the first message to one of the second protocol servers, the plurality of second protocol server comprising a plurality of Trivial File Transfer Protocol Servers.

* * * * *